US 11,788,507 B2

(12) United States Patent
Jacob

(10) Patent No.: US 11,788,507 B2
(45) Date of Patent: *Oct. 17, 2023

(54) VERTICAL AXIS WINDMILL WITH SHUTTERS AND BLINDS

(71) Applicant: WindRays Energy, LLC, Cambridge, MA (US)

(72) Inventor: Emil Jacob, Cambridge, MA (US)

(73) Assignee: WindRays Energy, LLC, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/333,992

(22) Filed: May 28, 2021

(65) Prior Publication Data

US 2021/0285417 A1 Sep. 16, 2021

Related U.S. Application Data

(63) Continuation of application No. 16/127,204, filed on Sep. 10, 2018, now Pat. No. 11,022,098.

(60) Provisional application No. 62/556,481, filed on Sep. 10, 2017.

(51) Int. Cl.
| *F03D 3/06* | (2006.01) |
| *F03D 3/00* | (2006.01) |
| *F03D 3/02* | (2006.01) |

(52) U.S. Cl.
CPC .............. *F03D 3/067* (2013.01); *F03D 3/005* (2013.01); *F03D 3/02* (2013.01); *F03D 3/061* (2013.01); *F05B 2240/218* (2013.01)

(58) Field of Classification Search
None
See application file for complete search history.

(56) References Cited

U.S. PATENT DOCUMENTS

| 8,043,499 B2* | 10/2011 | Saeed | F03D 9/11 290/55 |
| 8,210,817 B2 | 7/2012 | Iskrenovic | |
| 8,282,236 B2* | 10/2012 | Pelken | H02S 10/12 362/183 |
| 8,288,884 B1* | 10/2012 | Malcolm | F03D 9/25 290/55 |
| 8,322,992 B2* | 12/2012 | Fuller | F03D 3/062 415/4.4 |
| 8,454,314 B2* | 6/2013 | Yeh | F03D 3/067 416/219 A |
| 9,404,474 B2* | 8/2016 | Watanabe | F03D 3/061 |

(Continued)

*Primary Examiner* — Juan G Flores
(74) *Attorney, Agent, or Firm* — Foley Hoag LLP; Stephen J. Kenny

(57) ABSTRACT

A vertical axis windmill system for interacting with ground level winds has a plurality of vertical windmill units. Each vertical windmill unit includes a rotation unit and outer rings. The rings are secured to the vertical support columns. The rotation unit has a plurality of blades equally spaced around a rotatable center shaft. Each blade has a plate extending from the central shaft to an outer end. The plate has a curvature from an upper edge to the lower edge. Each of the blades has a plurality of openings. A plurality of flaps are pivotably mounted to the blade to move from an open position allowing air through the plurality of openings to a closed position limiting air through the plurality of openings. The system has a generator for converting the rotation motion of the rotatable central shaft to electrical energy.

20 Claims, 27 Drawing Sheets

(56) References Cited

U.S. PATENT DOCUMENTS 9,528,498 B2 * 12/2016 Bardia .................. H02K 7/183
11,022,098 B2 * 6/2021 Jacob ..................... F03D 3/005

* cited by examiner

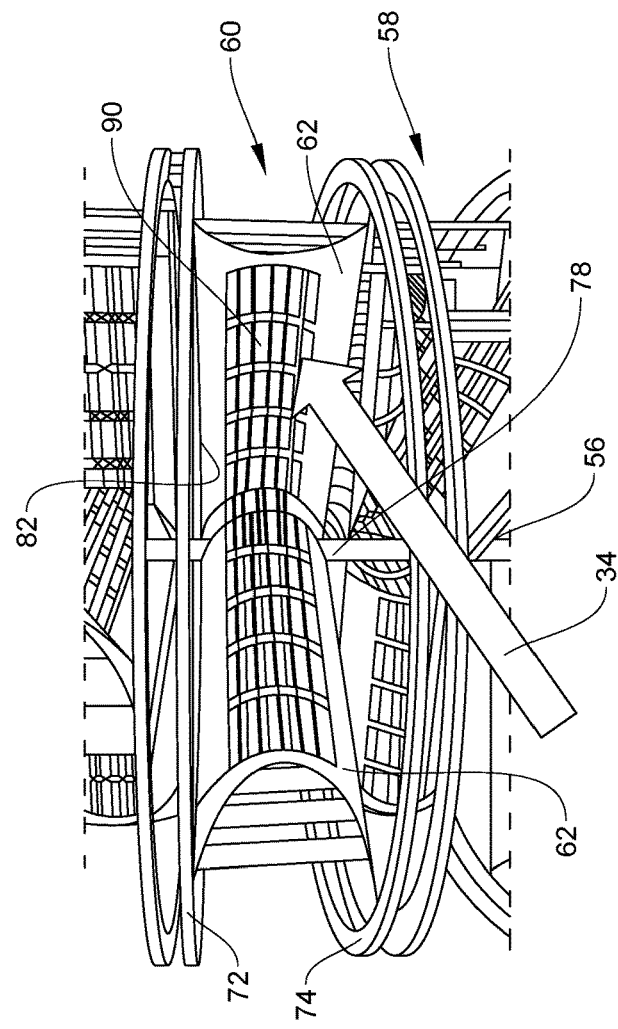
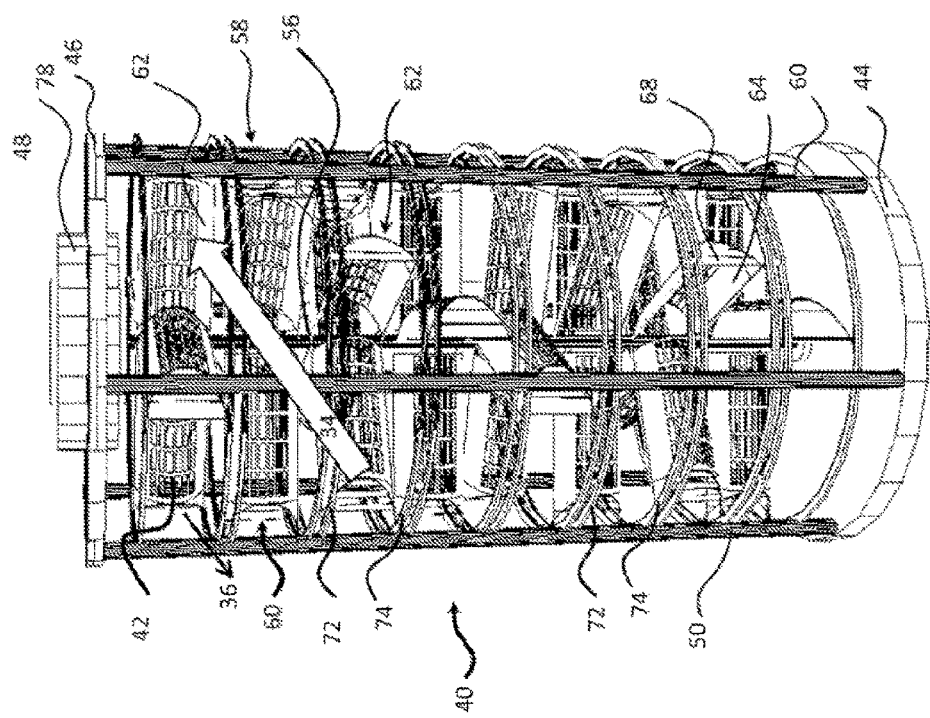
FIG. 2
FIG. 1

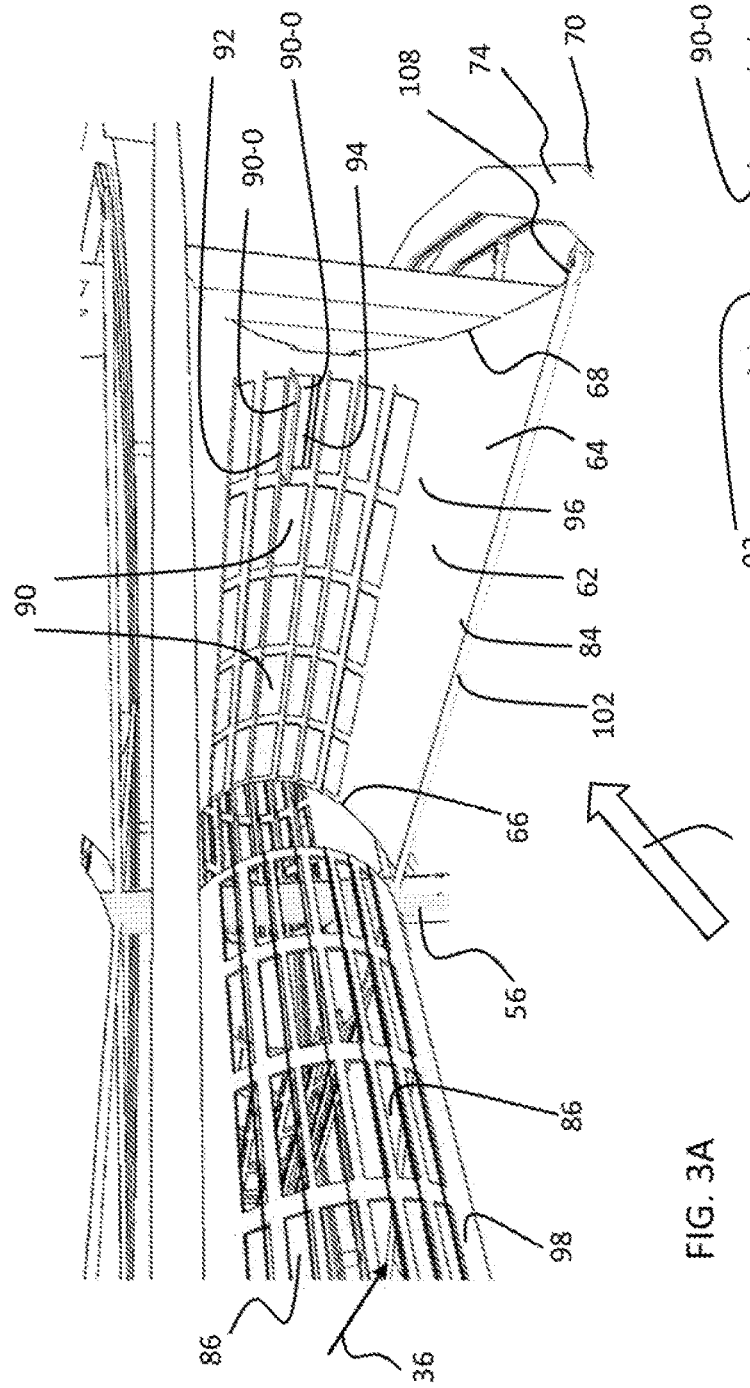
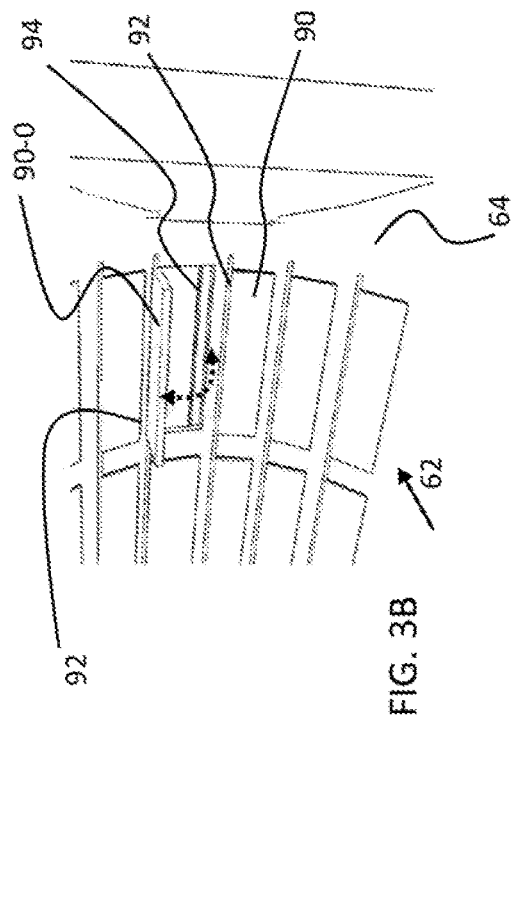
FIG. 3A
FIG. 3B

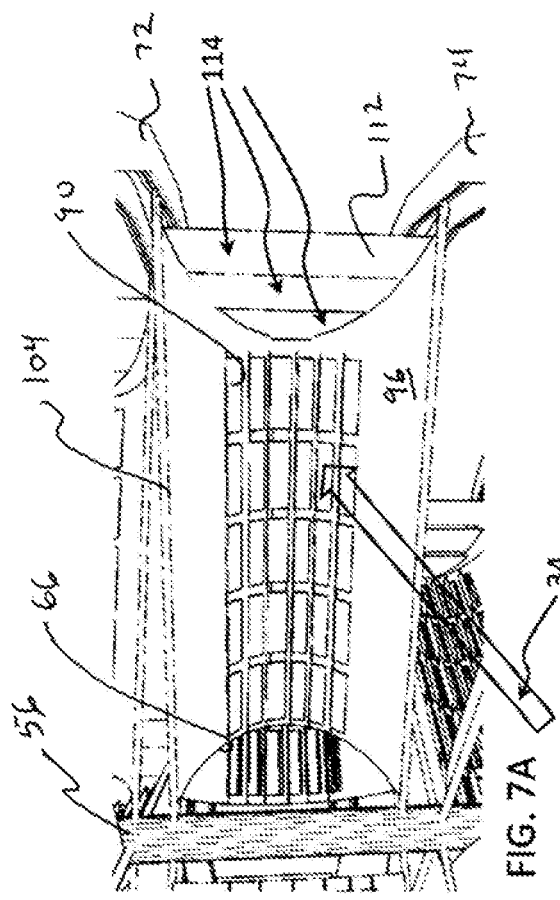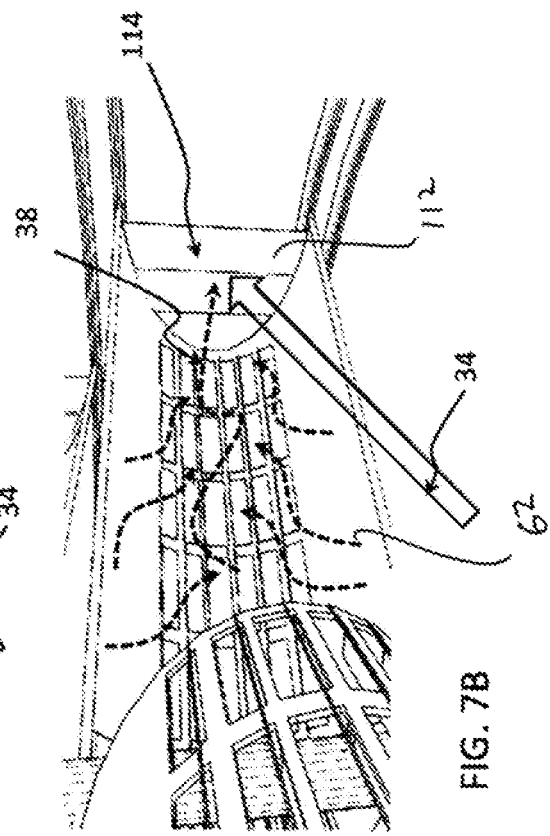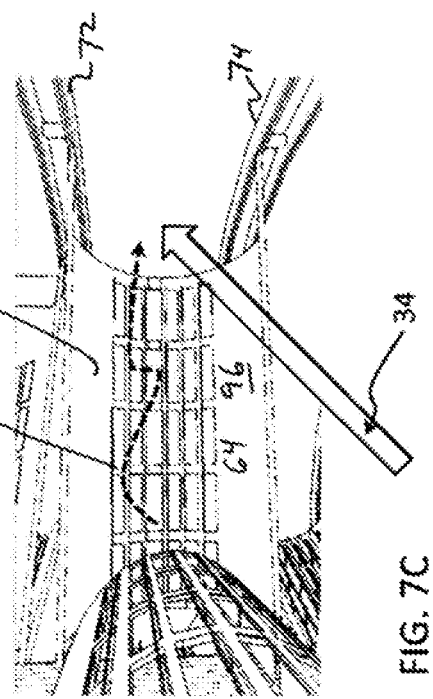

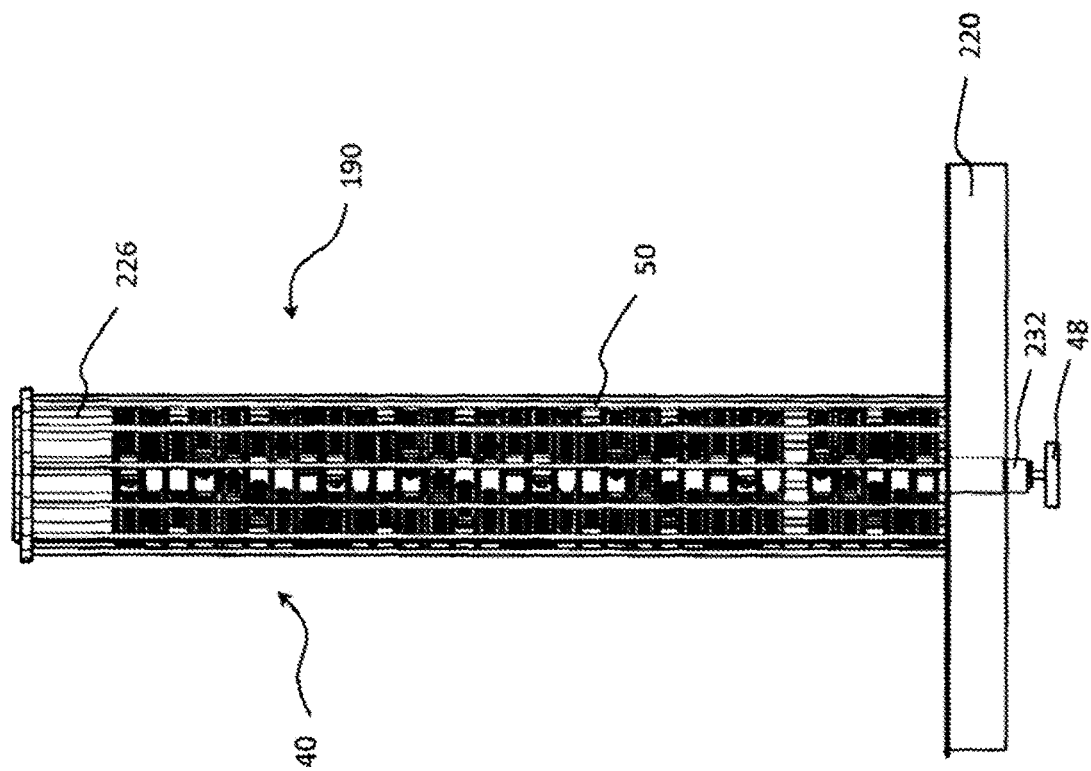

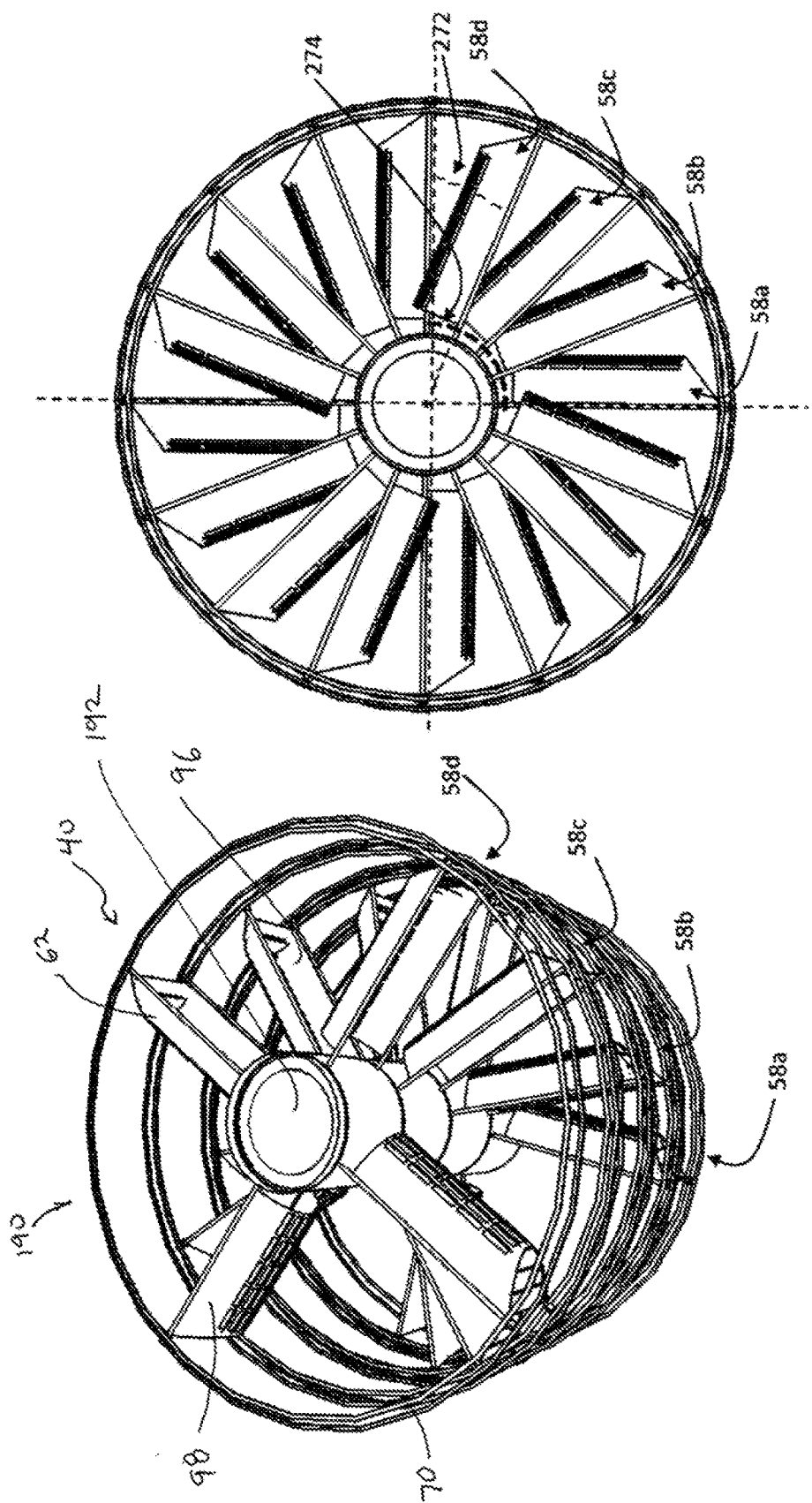

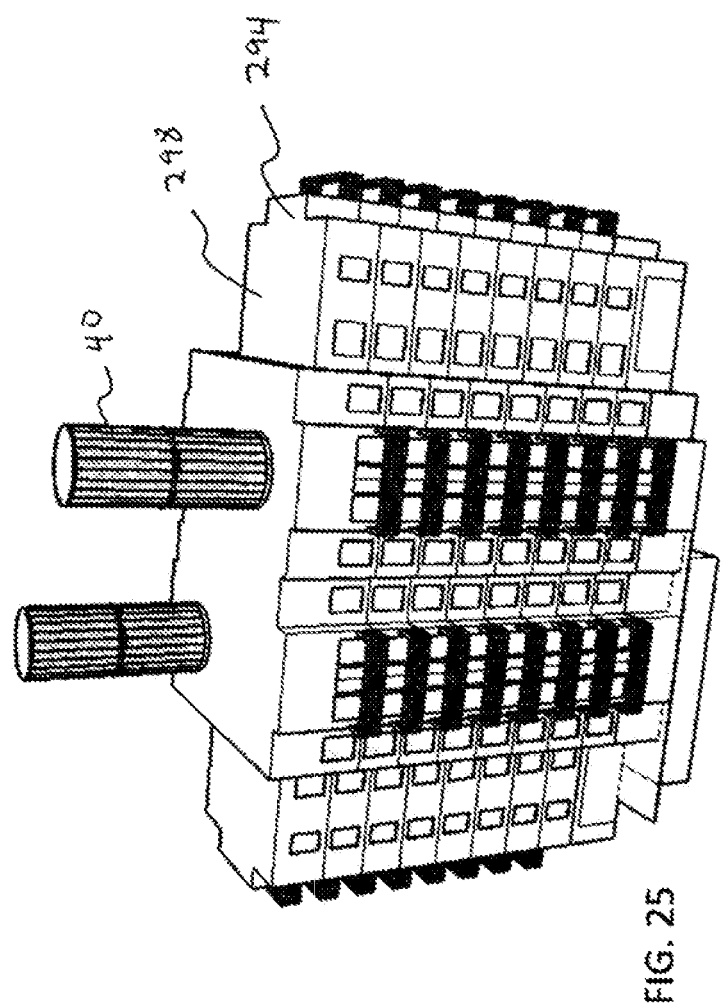

VERTICAL AXIS WINDMILL WITH SHUTTERS AND BLINDS

CROSS-REFERENCE TO RELATED APPLICATIONS

This patent application is a Continuation application and claims the benefit of priority under 35 USC 120 to application Ser. No. 16/127,204, filed Sep. 10, 2018, which claims the benefit of provisional application 62/556,481 filed Sep. 10, 2017, each of which is incorporated herein by reference.

TECHNICAL FIELD

The invention described herein relates to systems and methods of generating energy from wind energy. More specifically, the invention described herein includes systems and methods of using a vertical axis windmill with a plurality of generally horizontal curved blades having a plurality of openings which are opened and closed to increase efficiency.

BACKGROUND

There is a desire to move away from fossil fuels in generating power. There are several sources that are generally raised when discussing alternatives, including solar and wind. With wind energy, the conventional approach is to have a horizontal axis wind turbine located in areas that are distanced from population clusters.

SUMMARY

It is recognized that a vertical axis windmill system can be located in proximity to a population cluster or actually in cities and towns. The vertical axis windmill system can be sized to fit the area.

The invention reduces the necessity to create electrical grids to move the electricity from distant locations to the population cluster.

In an embodiment, a vertical axis windmill for interacting with ground level winds, the windmill has a rotation unit including a rotatable central shaft and a plurality of blades. Each blade has a plate extending from the central shaft to an outer end. The plate of each of the blades has an upper edge and a lower edge. The plate has a curvature from the upper edge to the lower edge. The plate of each of the blades has a plurality of openings. The rotation unit has a plurality of flaps. Each flap is pivotably mounted to the blade to move from an open position allowing air through the plurality of openings to a closed position limiting air through the plurality of openings. The system has a generator for converting the rotation motion of the rotatable central shaft to electrical energy.

In an embodiment, the rotation unit is a plurality of rotation units. Each rotation unit includes a section of the rotatable central shaft. Each of the rotation units has a minimum of three blades equally spaced around the 360 degrees from each other around the rotatable central shaft. Each of the blades is orientated in the same direction. A connector connecting the adjacent sections of the rotatable central shaft. A connector is located between the rotation unit to the generator.

In an embodiment, the system has an end plate secured to the outer end of the plate of the blade for redirecting the air associated with the wind. In an embodiment, the end plate includes a plurality of vertical flaps. Each flap is pivotably mounted to the blade to move from an open position allowing air through a plurality of vertical openings created by the vertical flaps to a closed position limiting air through the vertical openings.

In an embodiment, the vertical axis windmill has a base and a plurality of vertical support columns extending upward from the base. The vertical windmill unit includes one of the rotation units including a section of the rotatable central shaft and the plurality of blades. The vertical windmill unit also includes an upper outer ring and a lower outer ring. A plurality of vertical structural rods extend between the upper outer ring and the lower outer ring. A plurality of horizontal structural rods extend between portions of the ring. The rings are secured to the vertical support columns.

In an embodiment, the outer rings each have a vertical annular ring and a horizontal annular plate connected to the vertical ring. The system has a vertical wheel carried by each of the blades near the outer end upper edge for rotational engagement with the horizontal annular plate of the upper outer ring. A horizontal wheel is carried by each of the blades near the outer end upper edge for rotational engagement with the vertical annular ring of the upper outer ring. A vertical wheel is carried by each of the blades near the outer end lower edge for rotational engagement with the horizontal annular plate of the lower outer ring. A horizontal wheel is carried by each of the blades near the outer end upper edge for rotational engagement with the vertical annular ring of the upper outer rings, wherein the engagement of the wheel to the outer ring assists in stabilizing the rotation.

In an embodiment, the stabilizing structure includes a weight carried by the blade in proximity to the outer ring for assisting in stabilizing the blade.

In an embodiment, the system has an outer structure encircling the vertical windmill units including the rotation unit. The outer structure has a plurality of blinds that move between a closed position for hiding the vertical windmill units from the outside and an open position allowing ground-level winds to interact with the rotation unit of the vertical windmill unit.

In an embodiment, the curvature of the plate from the upper edge to the lower edge defines a concave side and a convex side. The plurality of openings generally extend from the inner edge to the outer edge. The opening generally covers the middle half of the plate from the upper edge to the lower edge. The flaps open from air passing from the convex side to reduce effective area and close from the air on the convex side to increase effective area.

In an embodiment, at least one of the vertical windmill units has a rotation section wherein the blades are configured to rotate counter-clockwise and at least one of the vertical windmill units has a rotation section wherein the blades are configured to rotate clockwise.

In an embodiment, the vertical axis windmill system has at least three distinct towers of vertical windmill units. Each tower includes a plurality of vertical windmill units. Each unit includes one of the rotation units, including a section of the rotatable central shaft, and the plurality of blades. The unit has an upper outer ring, a lower outer ring, and a plurality of vertical structural rods extending between the upper outer ring and the lower outer ring. In addition, the unit has a plurality of horizontal structural rods extending between portions of the ring. The rings are secured to the vertical support columns. A plurality of structural elements extend between the distinct towers for assisting in supporting the structure.

In an embodiment of a vertical axis windmill system for interacting with ground level winds, the windmill includes a base, an upper structure, and a plurality of vertical support columns extending from the base to the upper structure. The system has a plurality of vertical windmill units. Each vertical windmill unit includes a rotation unit, an outer ring having an upper ring above the rotation unit and a lower ring below the rotation unit. The rings are secured to the vertical support columns. The rotation unit of each of the vertical windmill units includes a rotatable central shaft. The rotation unit has a minimum of three blades equally spaced around the 360 degrees from each other around the rotatable center shaft. Each blade has a plate extending from the central shaft to an outer end. The plate of each of the blades has an upper edge and a lower edge. The plate has a curvature from the upper edge and the lower edge. In the plate of each of the blades is a plurality of openings. Each rotation unit has a plurality of flaps. Each flap is pivotably mounted to the blade to move from an open position allowing air through the plurality of openings to a closed position limiting air through the plurality of openings. The system has a generator for converting the rotation motion of the rotatable central shaft to electrical energy.

In an embodiment of the vertical axis windmill system, the system includes a water-powered system including an outer cylindrical rotating wall connected to the blades. The water-powered system has an inner second cylindrical wall defining a cylindrical reservoir for holding water. A propeller of the water-powered system converts the potential energy of the water above in the cylindrical reservoir into rotational energy. The rotational energy rotates the shaft to rotate the generator. The system has a water feed system having a plurality of levels defined by a transitional area between the levels. The water-powered system has a plurality of valves for allowing water to flow into the cylindrical reservoir at a level above the level of the cylindrical reservoir from the water feed system. The system includes a mechanism for moving the water in the water feed system from one segment to the next segment through the transitional area.

In an embodiment, the mechanism for moving the water in the water feed system from one transitional area to the next is a plurality of pumps powered by the energy generated by the rotation of the generator. In an embodiment, the mechanism for moving the water in the water feed system from one transitional area to the next is a plurality of vanes that are rotated by blades of the rotation unit. In an embodiment, the system is carried on a building.

In an embodiment of a vertical axis windmill system, at least one of the vertical windmill units has a rotation section wherein the blades are configured to rotate counter-clockwise and at least one of the vertical windmill units has a rotation section wherein the blades are configured to rotate clockwise.

In an embodiment of a vertical axis windmill system, there are at least three distinct towers of vertical windmill units. Each tower including a plurality of vertical windmill units including one of the rotation units have a section of the rotatable central shaft and the plurality of blades. A plurality of structural elements extend between the distinct towers for assisting in supporting the structure.

In an embodiment of a vertical axis windmill system, the system has at least one platform on the upper structure of at least one tower adapted for recreational use.

In an embodiment of a water-power system, the system has an outer cylindrical rotating wall and an inner second cylindrical wall defining a cylindrical reservoir for holding water. A propeller converts the energy potential of the water above in the cylindrical reservoir into rotational energy. The rotational energy rotates a shaft to rotate a generator. A water feed system has a plurality of levels defined by a transitional area. The system has a plurality of valves for allowing water to flow into the cylindrical reservoir at a level above the level of the cylindrical reservoir from the water feed system. A mechanism of the system moves the water in the water feed system from one segment to the next segment through the transitional area.

In an embodiment of a water-power system, the system includes a vertical axis windmill for interacting with ground level winds. The vertical axis windmill includes a base, an upper structure, and a plurality of vertical support columns extending from the base to the upper structure. The system has a plurality of vertical windmill units. Each vertical windmill unit includes a rotation unit, an outer ring having an upper ring above the rotation unit and a lower ring below the rotation unit. The rings are secured to the vertical support columns. The rotation unit of each of the vertical windmill units including a rotatable central shaft. A minimum of three blades are equally spaced around the 360 degrees from each other around the rotatable center shaft. Each blade has a plate extending from the central shaft to an outer end. The plate of each of the blades has an upper edge and a lower edge. The plate has a curvature from the upper edge to the lower edge. The plate of each of the blades has a plurality of openings. The system has a plurality of flaps each pivotably mounted to the blade to move from an open position allowing air through the plurality of openings to a closed position limiting air through the plurality of openings. A generator converts the rotation motion of the rotatable central shaft to electrical energy. An end plate is secured to the outer end of the plate of the blade for redirecting the air associated with the wind.

In an embodiment of a water-power system, there are at least three distinct towers of vertical windmill units. Each tower includes a plurality of vertical windmill units, including one of the rotation units including a section of the rotatable central shaft and the plurality of blades. A plurality of structural elements extend between the distinct towers for assisting in supporting the structure. At least one platform on the upper structure of at least one tower is adapted for recreational use.

In an embodiment of a vertical axis windmill for interacting with ground level winds, the windmill includes a base, an upper structure; and a plurality of vertical support columns extending from the base to the upper structure. The system has a plurality of vertical windmill units. Each vertical windmill unit includes a rotation unit, an outer ring having an upper ring above the rotation unit, and a lower ring below the rotation unit. The rings are secured to the vertical support columns. A plurality of vertical structural rods extend between the upper outer ring and the lower outer ring. The vertical windmill units each have a plurality of horizontal structural rods extending between portions of the ring wherein the rings are secured to the vertical support columns. The rotation unit of each of the vertical windmill units includes a rotatable central shaft and a minimum of three blades equally spaced around the 360 degrees from each other around the rotatable center shaft. Each blade has a plate extending from the central shaft to an outer end. The plate of each of the blades has an upper edge and a lower edge and a curvature from the upper edge to the lower edge. The plate of each of the blades has a plurality of openings. The rotation unit has a plurality of flaps each pivotably mounted to the blade to move from an open position allowing air through the plurality of openings to a closed position limiting air through the plurality of openings. The rotation unit has an end plate secured to the outer end of the plate of the blade for redirecting the air associated with the wind. The end plate includes a plurality of vertical flaps. Each flap is pivotably mounted to the blade to move from an open position allowing air through a plurality of vertical openings created by the vertical flaps to a closed position limiting air through the vertical openings. A generator converts the rotation motion of the rotatable central shaft to electrical energy.

The outer rings each have a vertical annular ring and a horizontal annular plate connected to the vertical ring. A vertical wheel is carried by each of the blades near the outer end upper edge for rotational engagement with the horizontal annular plate of the upper outer ring. A horizontal wheel is carried by each of the blades near the outer end upper edge for rotational engagement with the vertical annular ring of the upper outer ring. A vertical wheel is carried by each of the blades near the outer end lower edge for rotational engagement with the horizontal annular plate of the lower outer ring. A horizontal wheel is carried by each of the blades near the outer end upper edge for rotational engagement with the vertical annular ring of the upper outer ring. The engagement of the wheel to the outer ring assists in stabilizing the rotation.

In an embodiment of a vertical axis windmill system, the system has at least three distinct towers of vertical windmill units. Each tower includes a plurality of vertical windmill units including one of the rotation units including a section of the rotatable central shaft and the plurality of blades.

A plurality of structural elements extend between the distinct towers for assisting in supporting the structure. The system has a water-powered system including an outer cylindrical rotating wall connected to the blades. An inner second cylindrical wall defines a cylindrical reservoir for holding water. A propeller of the water-powered system converts the potential energy of the water above in the cylindrical reservoir into rotational energy. The rotational energy rotates the shaft to rotate the generator. A water feed system has a plurality of levels defined by a transitional area. The system has a plurality of valves for allowing water to flow into the cylindrical reservoir at a level above the level of the cylindrical reservoir from the water feed system. A mechanism of the water-powered system moves the water in the water feed system from one segment to the next segment through a transitional area. The system includes a solar array carried by the towers for generating additional energy.

BRIEF DESCRIPTION OF THE SEVERAL VIEWS OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a perspective view of a vertical axis windmill system;

FIG. 2 is an enlarged perspective view of a rotation unit of the vertical axis windmill system;

FIG. 3A is a perspective view of a plurality of blades;

FIG. 3B is an enlarged view of the end of blade with a flap open;

FIG. 7A is a perspective view of a blade with wind engaging the concave side of the blade closing all the horizontal flaps and vertical flaps;

FIG. 7B is a perspective view of the blade of FIG. 7A rotated slightly such that the direction of the wind relative to the blade is different;

FIG. 7C is a perspective view similar to that of FIG. 7B but without the end plate;

FIG. 17 is a perspective view of the vertical axis windmill system 40 of FIG. 16.

FIG. 22A is a perspective top view of the water-powered system of the system of FIG. 16;

FIG. 22B is a top view of the water-powered system of system of FIG. 22A;

FIG. 25 is a perspective view of an apartment building with a pair of vertical axis windmill systems on the roof;

FIG. 26 is a perspective view of a ship with a pair of vertical axis windmill system; and.

DETAILED DESCRIPTION

Figure 4A:
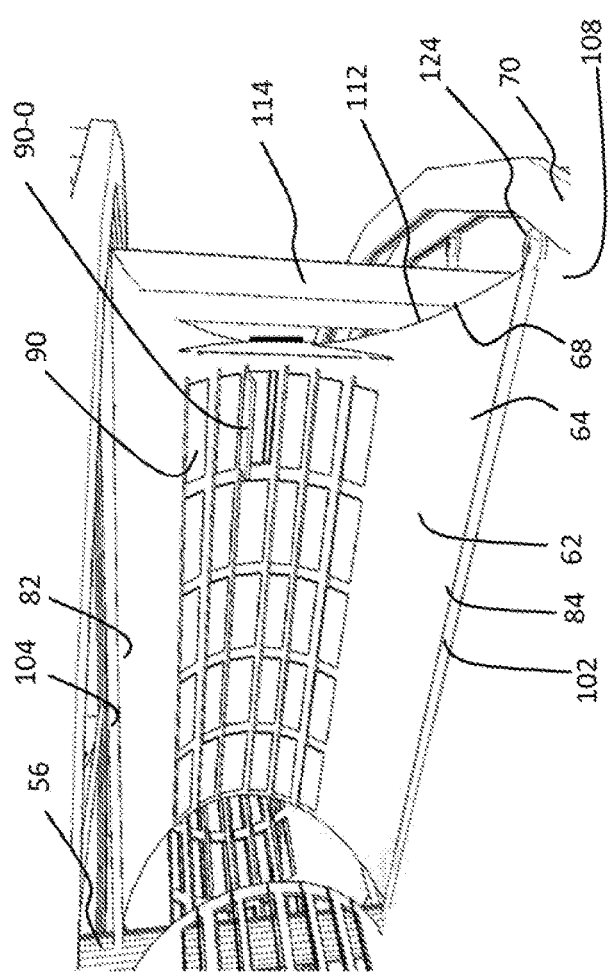
FIG. 4A is a view of the blade and the interaction of a stabilization structure with an outer ring.

A vertical axis windmill system for interacting with ground level winds includes a base, an upper structure; and a plurality of vertical support columns extending from the base to the upper structure. The system has a plurality of vertical windmill units. Each vertical windmill unit includes a rotation unit, an outer ring having an upper ring above the rotation unit, and a lower ring below the rotation unit. The rings are secured to the vertical support columns. A plurality of vertical structural rods extend between the upper outer ring and the lower outer ring. The vertical windmill units each have a plurality of horizontal structural rods extending between portions of the ring wherein the rings are secured to the vertical support columns. The rotation unit of each of the vertical windmill units includes a rotatable central shaft and a minimum of three blades equally spaced around the 360 degrees from each other around the rotatable center shaft. Each blade has a plate extending from the central shaft to an outer end. The plate of each of the blades has an upper edge and a lower edge and a curvature from the upper edge to the lower edge. The plate of each of the blades has a plurality of openings. The rotation unit has a plurality of flaps or shutters each pivotably mounted to the blade to move from an open position allowing air through the plurality of openings to a closed position limiting air through the plurality of openings. The rotation unit has an end plate secured to the outer end of the plate of the blade for redirecting the air associated with the wind. The end plate includes a plurality of vertical flaps. Each flap is pivotably mounted to the blade to move from an open position allowing air through a plurality of vertical openings created by the vertical flaps to a closed position limiting air through the vertical openings. A generator converts the rotation motion of the rotatable central shaft to electrical energy.

Referring to FIG. 1, a perspective view of a vertical axis windmill system 40 is shown. The system 40 has a base 44 and an upper structure 46 which support a generator 48. The system 40 has a plurality of vertical support columns 50 extending upward from the base 44 to the upper structure 46. Interposed between the base 44 and the upper structure 46 is a plurality of rotation units 60. A rotatable central shaft 56 extends upward from the base 44 to the generator 48.

The generator 48 has a rotor that is rotated by the rotatable central shaft 56 and a stator. The rotation of the rotor relative to the stator to generate electricity.

In the embodiment shown, the system 40 has eight vertical windmill units 58 each with a rotation unit 60. Each rotation unit 60 has a plurality of blades 62. Each blade 62 has a plate 64 that extends generally from the central shaft 56 to an outer edge 68.

Each of the vertical windmill units 58 has an upper ring 72 and a lower ring 74. The rings 72 and 74 for each of the vertical windmill units 58 are secured to the vertical support columns 50.

Still referring to FIG. 1, an arrow 34 represents the direction of the wind. The blades 62 are rotated counter-clockwise in the embodiment shown. An arrow 36 shows the direction of movement of the blade 62 on the left side of the FIG.

Referring to FIG. 2, an enlarge perspective view of a vertical windmill unit, including a rotation unit 60 of the vertical axis windmill system 40, is shown. The vertical windmill unit 58 includes the upper ring 72, the lower ring 74, and the rotation unit 60 which includes the blades 62 interposed between the rings 72 and 74, and a segment 78 of the rotatable central shaft 56.

The upper ring 72 of one of the vertical windmill unit 58 is secured to the lower ring 74 of the vertical windmill unit 58 above by a plurality of outer ring supports 76. The lower ring 74 of the unit 58 is secured to the upper ring 74 of the vertical windmill unit 58 below by a plurality of outer ring supports 76. The vertical support columns 50 are not shown in the FIG.

Referring to FIG. 3A, a perspective view of a plurality of blades 62 of a rotation unit 60 of the vertical windmill unit 58 are shown. Each of the blades 62 has a plate 64 that extends from an inner edge 66 in proximity to the central shaft 56 to the outer edge 68. Each plate 64 has an upper edge 82, as seen in FIG. 2 and a lower edge 84. Each plate 64 has a curvature from the upper edge 82 to the lower edge 84. Each of the blades 62 has a plurality of openings 86 that are located generally on the central horizontal region of the plate 64 with a portion of the plate 64 near both the upper edge 82 and the lower edge 84 not having openings 86. Each of the blades 62 has a plurality of flaps 90; also referred to as a shutters. Each of the flaps 90 is pivotably mounted to the plate 64 of the blade 62 by a hinge 92 for moving between an open position and a closed position limiting air through the openings 86 in the curved plate 64 of the blade.

The wind as represented by arrow 34 pushes against a concave side 96 of the plate 64 of the blade 62 to push the blade 62 into the page. The flaps 90 are closed. An arrow 34 represents the direction of the wind. The blades 62 are rotated counter-clockwise in the embodiment shown. An arrow 36 shows the direction of movement of the blade 62 on the left side of the FIG. 1n addition, the force of the air causes the horizontal flaps 90 to be in the closed positon, therein increasing the effective area of the plate 64.

The blade 62 shown on the right side of the figure shows the flaps 90 closed with the exception of one flap 90-O that is shown open. The wind as represented by arrow 36 forces the flaps 90 to the closed position where the entire plate 64 surface area is closed. The flap 90-O that is open on this blade 62, is done as an example to show a flap stopper 94 on the convex side 98 of the plate 64 of the blade 62.

The blade 62 shown on the left side of FIG. 3A shows all the openings 86 in the plate 64 in that the flaps 90 are in the open position. As the wind pushes the blade 62 on the right side, in that all of the blades 62 are secured to the rotatable central shaft 56 the other blades 62 are moved in the counter-clockwise direction (into the page on the right side and out of the page on the left side). The movement of the blades 62 results in the blades 62 that are not in the direction of the wind not having the force of the wind on the concave side 96 of the plate 64 of the blade 62. Therefore the movement of the blades 62 and the wind on the convex side 98 of the blade 62 forces the movement of the flaps 90 to the open position. The air is allowed to flow through the openings 86 therein effectively reducing the surface area of the blade 62.

The lower edge 84 of the plate 64 is secured to a lower horizontal support rod 102 that extends from the rotatable central shaft 56 to a stabilizing structure 108 at the outer end of the support rod 102 in proximity to the lower ring 74 of the outer ring 70. The upper edge 82 of the plate 64 is secured to an upper horizontal support rod 104, as seen in FIG. 4A and FIG. 4B, that extends from the rotatable central shaft 56 to a stabilizing structure 108 at the outer end of the support rod 102 in proximity to the upper ring 72 of the outer ring 70.

The blade 62 at the outer end or edge 68 has an end plate 112 that closes the end on the concave side 96 formed by the curvature of the plate 64 of the blade 62. In the embodiment shown, the end plate 112 is formed of a plurality of vertical flaps 114; also referred to as a shutter.

Referring to FIG. 3B, an enlarged view of the end of the blade 62 with a flap 90 open is shown. The horizontal flap 90 is pivotably connected to the plate 64 of the blade 62 by the hinge 92. When the flap 90 is in the closed position due to wind pressure on the concave side 96 of the blade 62, the horizontal flap 90 is stopped by a flap stopper 94 from going beyond the plane of the curved plate 64 and capture maximal wind force. In an embodiment, the flap stopper 94 is a rod secured to the convex side 98 and extends near the lower edge of each of the openings 86

Figure 4B:
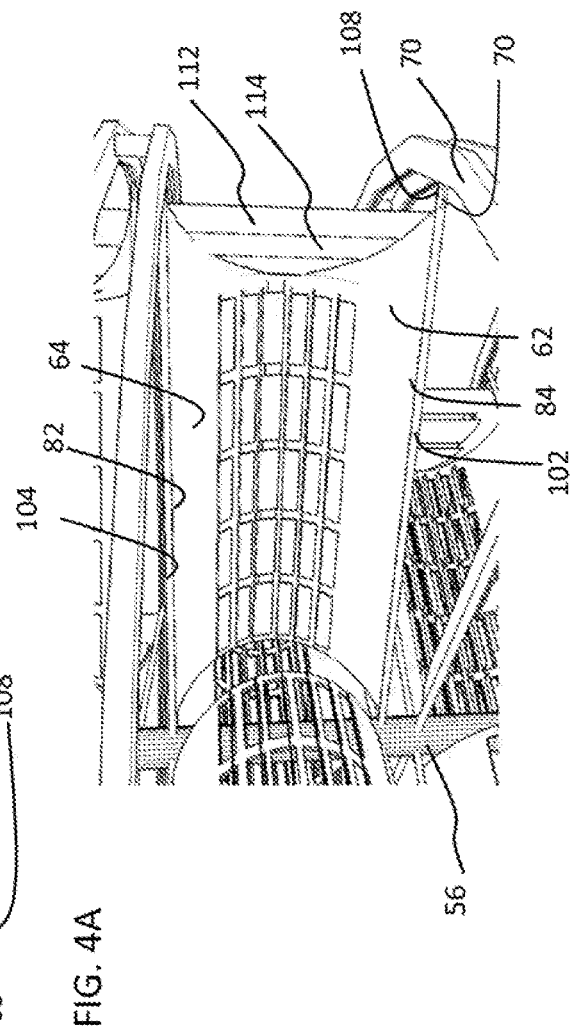
FIG. 4B is another view of the blade and the interaction of the stabilization structure with the outer ring.

Referring to FIG. 4A, a perspective view of one of the blades 62 and the stabilizing structure or mechanism 108 interacting with the outer ring 70 is shown. The plate 64 of the blade 62 is shown with thirty (30) flaps 90 that overlay openings 86 in the curved plate 64. As shown, twenty-nine (29) of the flaps 90 are shown in the closed position. The remaining flap 90-O is shown in the open position. In use, all of the flaps 90 generally will be in an identical or similar position on a blade 62. One of the vertical flaps 114 on the end plate 112 is shown closed.

The upper edge 82 of the plate 64 is secured to the upper horizontal support rod 104 which extends to the rotatable central shaft 56. The lower edge 84 of the plate 64 is secured to the lower horizontal support rod 102 which extends from the rotatable central shaft 56 to the stabilizing structure 108 at the end. The stabilizing structure 108 includes a horizontal wheel 124 that rolls along a vertical annular ring 128, as best seen in FIG. 5A.

Referring to FIG. 4B, a perspective view of the blade 62 and the interaction of the stabilization structure 108 with the outer ring 70 is shown. All of the vertical flaps 114 on the end plate 112 are shown open.

The upper edge 82 of the plate 64 is secured to the upper horizontal support rod 104 which extends to the rotatable central shaft 56. The lower edge 84 of the plate 64 is secured to the lower horizontal support rod 102 which extends from the rotatable central shaft 56 to the stabilizing structure 108 at the end. The stabilizing structure 108 includes a horizontal wheel 124 that rolls along the horizontal plate 130 as best seen in FIG. 5A.

Figure 5B:
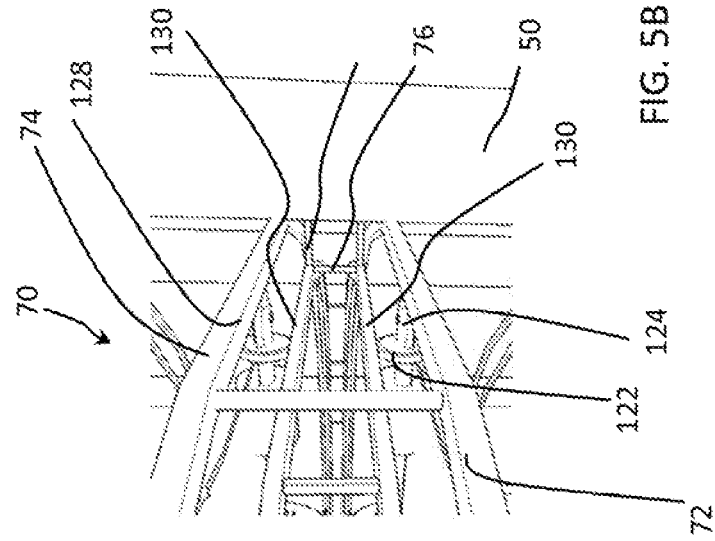
FIG. 5B is a perspective view of a portion of the outer ring and the stabilization structure.
Figure 5A:
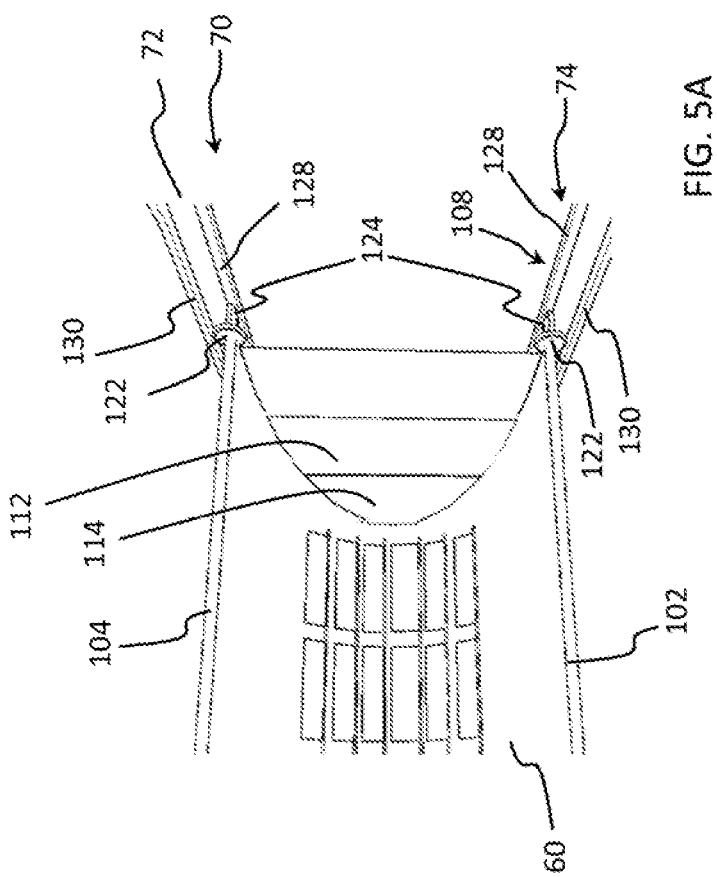
FIG. 5A is a perspective view looking towards an outer plate of the blade and the stabilization structure interaction with the outer ring.

Referring to FIG. 5A, a perspective view looks towards the end plate 112 of the blade 62 and the stabilization structure 108 interaction with the outer ring 70 is shown. All of the vertical end flaps 114 are shown in the closed position. The stabilization structure 108 has a vertical wheel 122 and a horizontal wheel 124. The wheels 122 and 124 are located at the end of horizontal support rods 102 and 104

Both the upper ring 72 and the lower ring 74 of the outer ring 70 each have a vertical annular ring 128 and a horizontal annular plate 130 in proximity to the vertical annular ring 128.

The vertical wheel 122 carried by the stabilizing structure 108 of the upper horizontal support rod 104 near the outer upper edge of the plate 64 of the blade 62 is in rotational engagement with the horizontal annular plate 130 of the upper outer ring 72. The horizontal wheel 124 in proximity to the vertical wheel 122 near the upper edge of the plate 64 of the blade 62 is in rotational engagement with the vertical annular ring 128 of the upper outer ring 72.

The vertical wheel 122 and the horizontal wheel 124 carried by the stabilizing structure 108 of the lower horizontal support rod 102 near the lower upper edge of the plate 64 of the blade 62 are in rotational engagement with the horizontal annular plate 130 and the vertical annular ring 128 of the lower outer ring 74 respectively.

Referring to FIG. 5B, a perspective view of a portion of the outer ring 70 and the stabilization structure 108 is shown. One of the outer ring supports 76 is shown extending between the lower ring 74 of the upper vertical windmill unit 58 and the upper ring 72 of the lower vertical windmill unit 58. Each of the rings 70 has a vertical annular ring 128 and a horizontal annular plate 130. The vertical wheel 122 is in engagement with the horizontal annular plate 130. The stabilizing structure 108 allows the blades 62 to reduce some of the structural weight of the rotation unit 60 therein reducing the weight of the rotation unit which needs to be pushed by the wind.

Figure 6A:
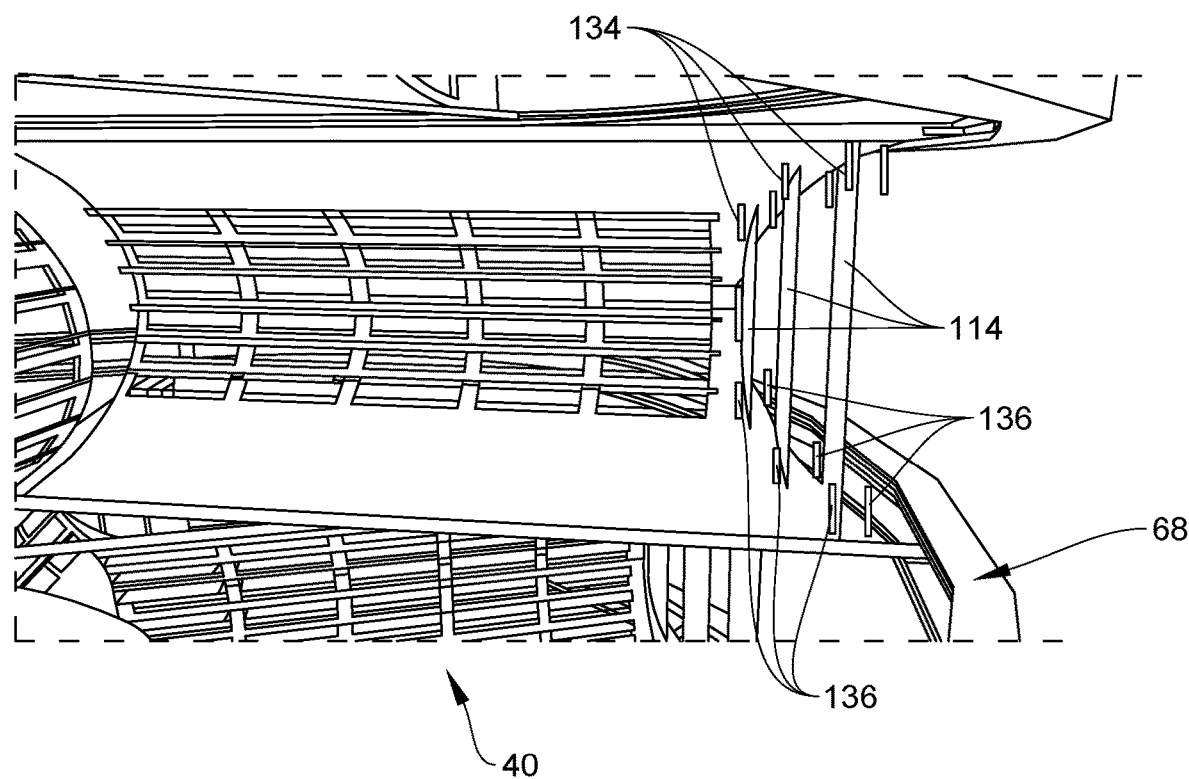
FIG. 6A is a perspective view of a blade where the direction of the wind is coming out of the page.

Referring to FIG. 6A, a perspective view of a blade 62 where the wind is coming out of the page is shown. The force of the air on the convex side, not seen, is greater than the force on the concave side 96 so the horizontal flaps 90 are open. In addition, the vertical flaps 114 are open. The vertical axis windmill system 40 has a vertical open stopper 134 associated with each of the vertical flaps 114 to limit the movement of the vertical flaps 114 in the open direction. In addition, each vertical flap 114 has an associated vertical closed stopper 136 to limit movement in the closed position direction. The flaps are shown open on the plate 64 of the blade 62 and the vertical flaps to effectively minimize the surface of the blade 62.

Figure 6B:
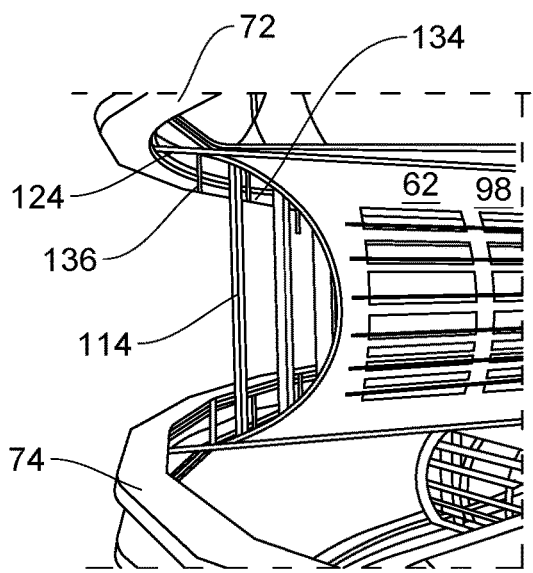
FIG. 6B is a perspective view of the end of the blade where the direction of the wind is going into the page.

Referring to FIG. 6B, a perspective view of the end of the blade 62 where the wind is going into the page is shown. The horizontal flaps 90 and the vertical flaps 114 are shown open. The vertical flap flaps 114 are shown in proximity to the vertical open stoppers 134. The horizontal wheels 124 of the stabilizing structure 108 is shown in engagement with the upper ring 72 and the lower ring 74.

Referring to FIG. 7A, a perspective view of a blade 62 with wind engages the concave side 96 of the plate 64 of the blade 62 closing all the horizontal flaps 90 and vertical flaps 114 is shown. The closed flaps 90 and 114 with the wind direction 34 generally perpendicular to the blade 62 results in the majority of the energy of the wind being captured.

Referring to FIG. 7B, a perspective view of the blade 62 of FIG. 7A is rotated slightly is shown such that the direction of the wind as represented by arrow 34 relative to the blade 62 is different. The blade 62 has turned approximately 45 degrees from FIG. 7A. The force of the wind is redirected as indicated by arrow 18 moving towards the vertical flaps 114 which captures the force.

Referring to FIG. 7C, a perspective view similar to that of FIG. 7B but without the end plate 112 is shown. Without the end plate 112 which has the plurality of vertical flaps 114 in FIG. 7B, a portion of the force of the air from the wind as represented by arrow 34 is lost out the end of the blade 62. A portion of the wind is redirected as indicated by the arrow 38, sliding outward after hitting the plate 64.

Figure 8:
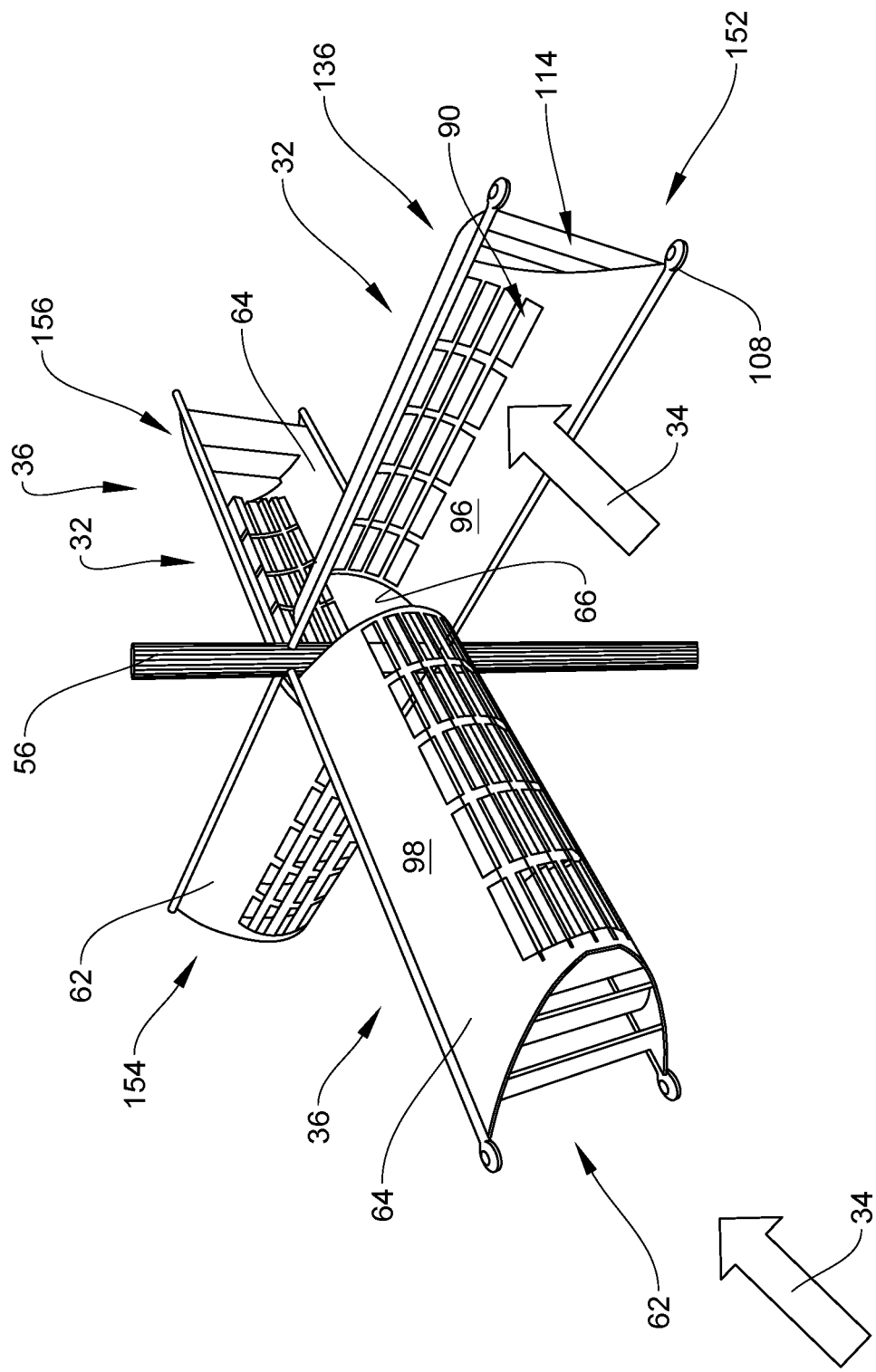
FIG. 8 is a simplified perspective view of four blades around the rotatable central shaft.

Referring to FIG. 8, a simplified perspective view of four blades 62 around the rotatable central shaft 56 is shown. The blade 62 on the right side of the FIG., is referred to as a closed, power blade 152 in that the wind as represented by arrow 34 is generally perpendicular to the blade 152 and pushing on the concave side 96 of the plate 64. The force of the air created by the wind 34 is greater than the force of the air, as represented by arrow 32, against the convex side 98 of the plate 64. This difference in the air pressure on the two sides of the plate 64, the concave side 96 and the convex side 98, causes the horizontal flaps 90 and vertical flaps 114 to close.

The blade 62 on the back, left side of the FIG., is referred to as an open fluttering blade 154 in that the wind as represented by arrow 34 is generally perpendicular to the blade 62 and pushing on convex side 98 of the plate 64. The force of the air created by the wind 34 is greater than force of the air, as represented by arrow 32, against the concave side 96 of the plate 64. This difference in the air pressure on the two sides of the plate 64, the concave side 96 and the convex side 98, causes the horizontal flaps 90 and vertical flaps 114 to be open. With the flaps open, the air can pass through the openings 86 and between the vertical flaps 114 therein reducing the effective surface area of the plate 64 of the blade 62.

Still referring to FIG. 8, the blades on the front left side and the back right side of the FIG are referred to as an open neutral blade 156 in that the wind as represented by arrow 34 is generally parallel to the plate 64 of the blade 62. This results in the force of the air on the plate 64 of the blade 62 to be generally greater on the convex side 98 than the concave side 98 mostly because of the rotation of the blade 62 caused by the rotation of the rotatable central shaft 56 caused by force imparted to the rotatable central shaft 56 by the closed, power blade 152.

Figure 9:
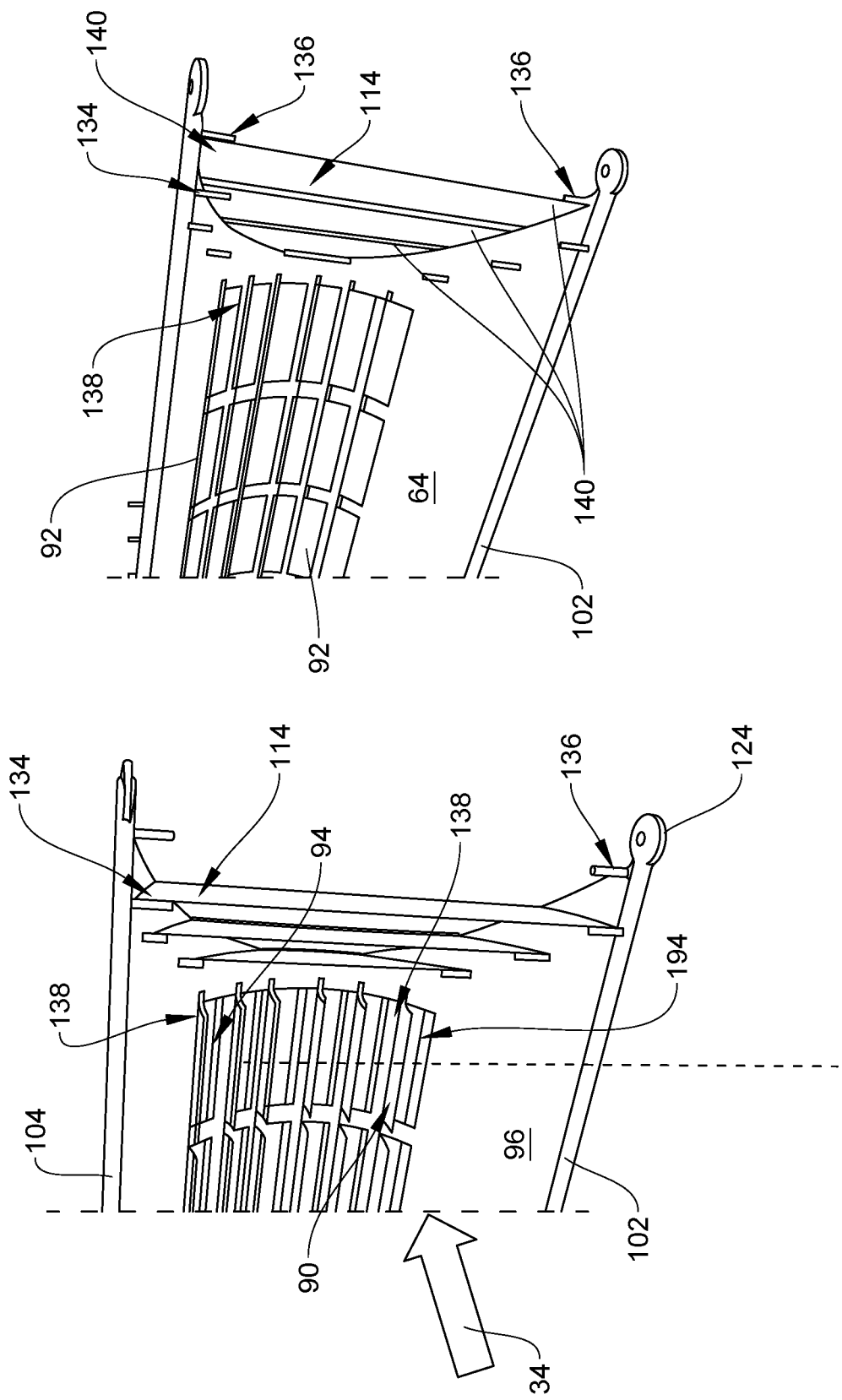
FIG. 9A is a perspective view of the concave side of the end of the blade with the flaps in the open position.
FIG. 9B is a perspective view of the end of the blade with the flaps in the closed position.

Referring to FIG. 9A, a perspective view of the concave side 96 of the end of the blade 62 with the flaps 90 and the vertical flaps 114 in the open position is shown. The vertical axis windmill system 40 has a horizontal open-stopper 138 associated with each of the flaps 90 to ensure that the horizontal flaps 90 can only open to a certain point. The open-stopper 138 ensures that when the wind hits the flaps 90 from the concave side 98 the flap 90 is forced down. In a preferred embodiment, the angle is in of 80-90 degree range. Similarly vertical flaps 114 are limited by the vertical open-stopper 134 associated with each of the vertical flaps 114 so that when wind as represented by arrow 34 pushes against the concave side 96, of the blade 62 it ensures the flaps 114 close.

In addition, the vertical axis windmill system 40 has the second set of stoppers, the vertical closed-stopper 136 to keep the vertical flaps 114 in place under the wind pressure.

Referring to FIG. 9B, a perspective view of the end of the blade with the flaps in a closed position is shown. The horizontal flap 90 is closed against the flap stopper 94, as seen in FIG. 9A. The vertical flaps 114 are held against the vertical closed stoppers 136. In addition, the vertical flaps 114 have a plurality of noise reducers in the form of a rubber damper material 140 at the point of contact of the stopper 134 and 136 with the vertical flaps 114 in order to minimize noise when hitting against the stoppers.

Figure 10:
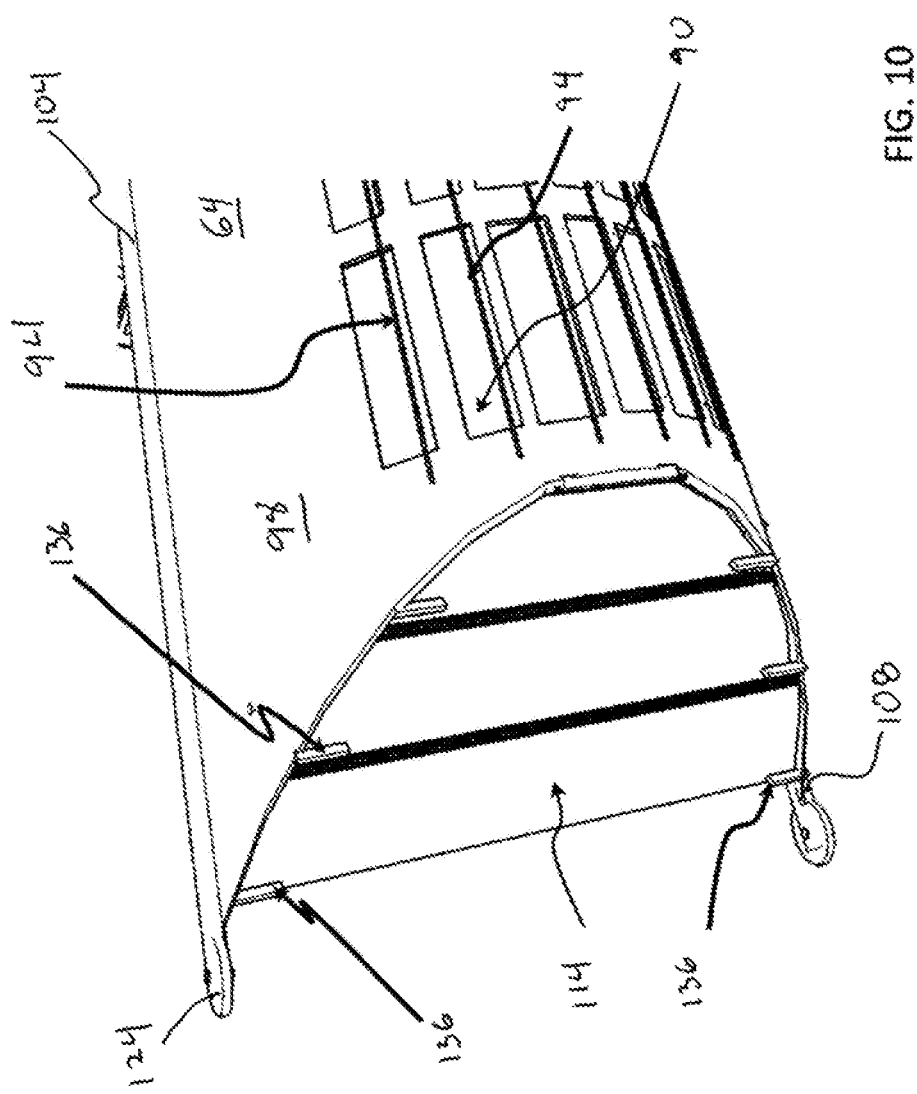
FIG. 10 is a perspective view of the convex side of the end of the blade with the flaps in the closed position.

Referring to FIG. 10, a perspective view of the convex side 98 of the plate 64 of the end of the blade 62 is shown with the horizontal flaps 90 and the vertical flaps 114 are in the closed position. The horizontal flap stoppers 70 are shown with the horizontal flaps 90 in engagement. The vertical closed stoppers 136 are shown with the vertical flaps 114 in engagement.

Figure 11A:
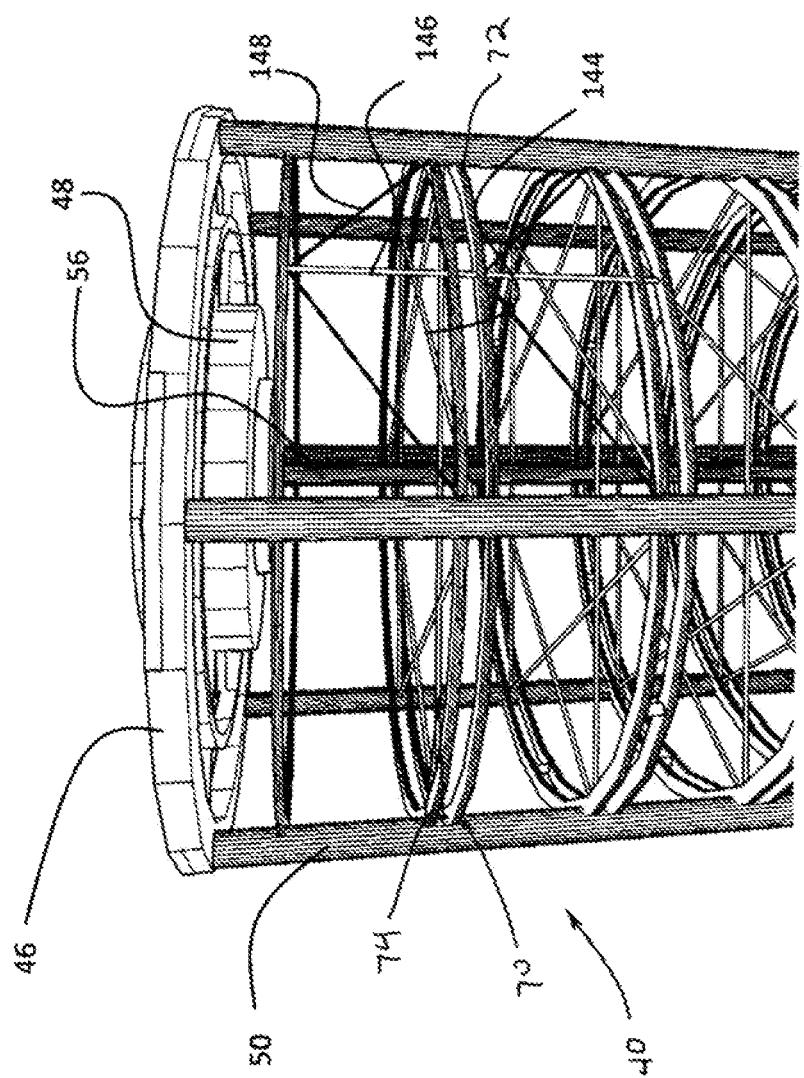
FIG. 11A is a perspective view of a portion of the vertical axis windmill system with rotation units not shown.

Referring to FIG. 11A, a perspective view of a portion of the vertical axis windmill system 40 is shown with rotation units not shown. Each vertical windmill unit 58 has an outer ring 70 including an upper ring 72 and a lower ring 74. The vertical windmill unit 58 is supported by the plurality of vertical support columns 50. The outer ring supports 76 extend between adjacent outer rings 70, that is between the lower ring 74 of the upper outer ring 70 and the upper ring 72 of the lower outer ring 70.

In addition, the vertical windmill unit 58 has a plurality of horizontal supports 144 that extend between various points within the ring 70 including both the upper ring 72 and the lower ring 74. In addition, there are a plurality of vertical structural elements 146 and angle structural elements 148 between the two rings 72 and the 74 of the ring.

The upper structure 46 is shown with the generator 48. The rotatable center shaft 56, which would be part of the rotation unit 60, is shown extending upward to the generator 48.

Figure 11B:
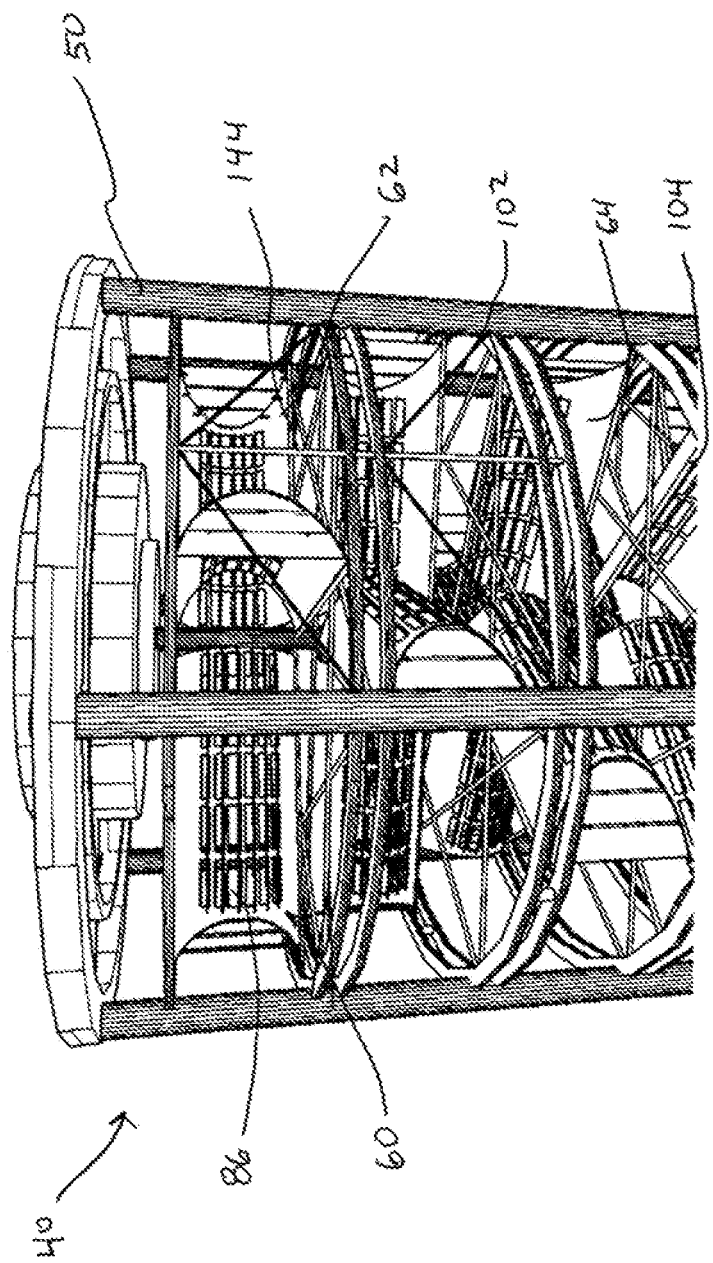
FIG. 11B is a perspective view similar to FIG. 11A of a portion of the vertical axis windmill system with rotation units.

Referring to FIG. 11B, a perspective view similar to FIG. 11A of a portion of the vertical axis windmill system 58 with the rotation units 60 is shown. The plurality of the blades 62 are shown. Each of the blades 62 have a curved plate 64 with a plurality of openings 86. The upper edge 82 is connected to the upper horizontal support rod 104 which extends from the rotatable center shaft 56 to the outer ring 70. Each vertical windmill unit 58 includes the horizontal support members 144, the vertical structural elements 146, and the angle structural elements 140.

Figure 12:
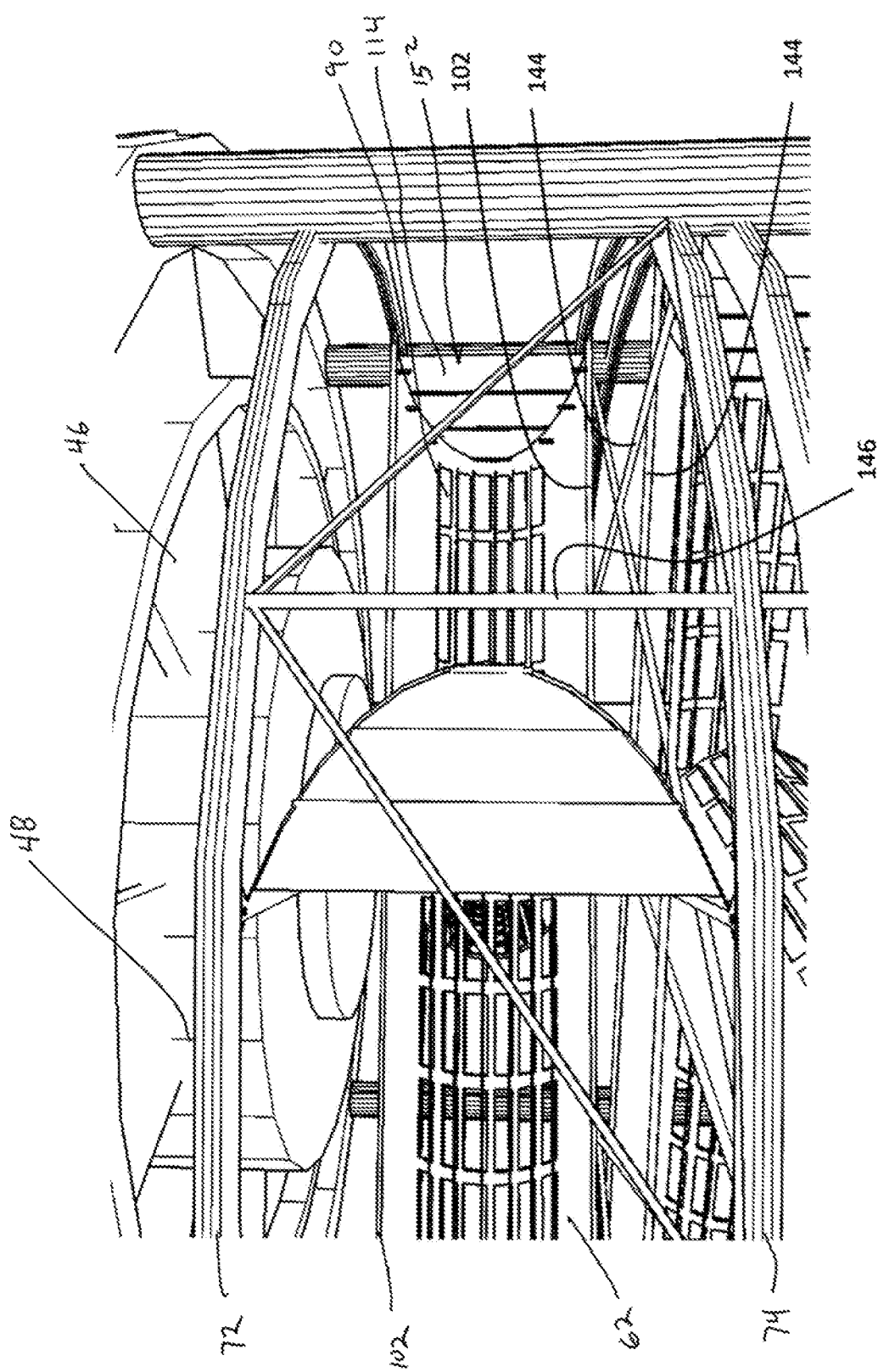
FIG. 12 is a perspective view of a vertical windmill unit showing additional structure.

Referring to FIG. 12, a perspective view of a vertical windmill unit 58 is shown. The blade 62 on the right side of the figure is shown in the power blade position 152 with the flaps 90 in the closed position. In addition, the vertical flaps 114 are closed. The vertical open stoppers 134 can be seen on the blade 62. The vertical windmill unit 58 that is shown is close to the top of the vertical axis windmill system 40 and shows the upper structure 46 and the generator 48.

Figure 13A:
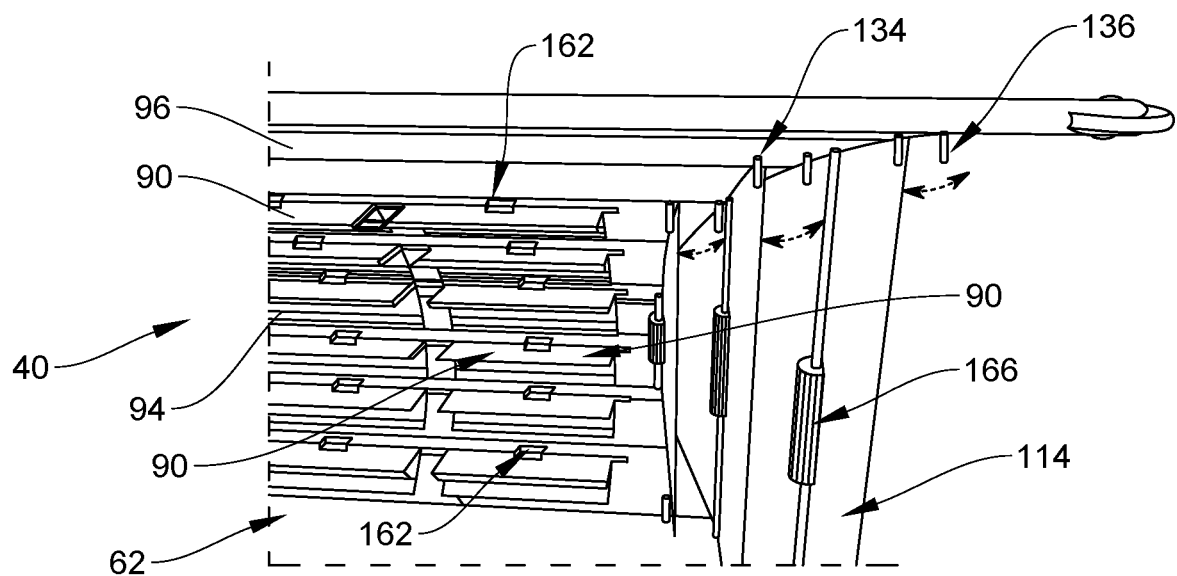
FIG. 13A is a perspective view of the concave side of the end of the blade with the flaps in the open position.

Referring to FIG. 13A, a perspective view of the concave side 96 of the end of the blade 62 with the horizontal flaps 90 and the vertical flaps 114 in the open position is shown. In this embodiment, the vertical axis windmill system 40 has a plurality of electric motors 162. An electric motor 162 is coupled with the hinge 92 of the flat of the horizontal flap 90 to increase the speed with which the flap 90 opens and closes. The amount of energy that the electric motor 162 uses is minimal; the purpose of the motor is to aid the flap 90 to move in the direction in which the flap is already moving. Thus if the wind pressure 34 is moving the flap down—once it reaches a certain angle from horizontal towards vertical (to closing), a sensor activates the motor 162 to close the flap 90 faster.

In addition, there is an electric motor 166 associated with each of the vertical flaps 114. The electric motors designed to speed the closing or opening of the flaps become relevant for large-scale models where a flap can be over 2' wide.

Figure 13B:
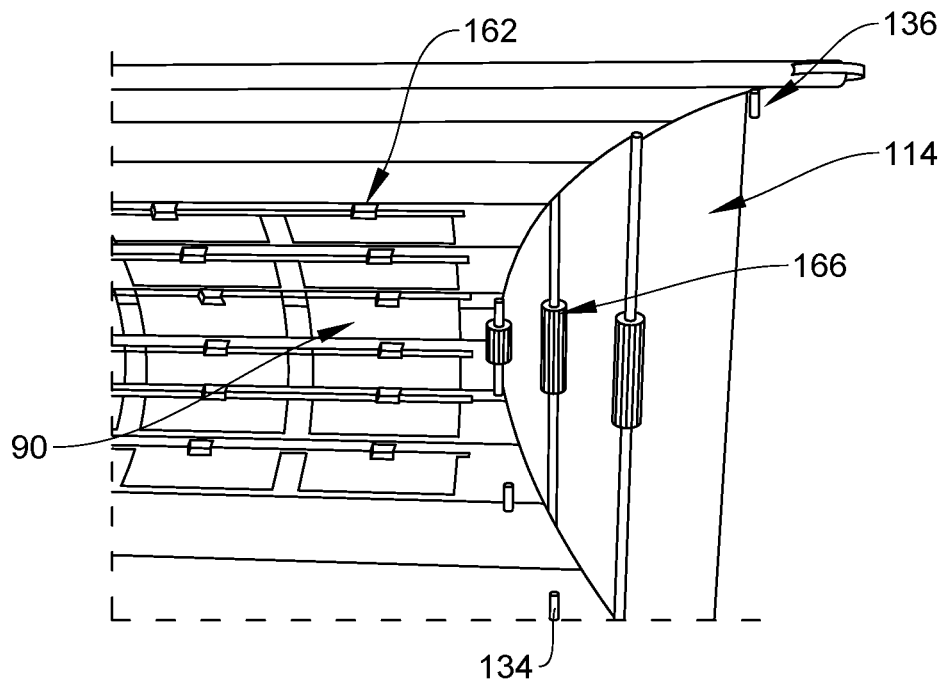
FIG. 13B is a perspective view of the end of the blade of FIG. 13A with the flaps in closed position.

Referring to FIG. 13B, a perspective view similar to FIG. 13A with the horizontal flaps 90 and the vertical flaps 114 in the closed position is shown. The electrical motors 162 for the horizontal flaps 90 and the electrical motors 166 for the vertical flaps 114 are shown. The vertical flaps 114 are closed and engaging the vertical closed stoppers 136, not seen in this figure. The vertical open stoppers 134 are seen.

Figure 14B:
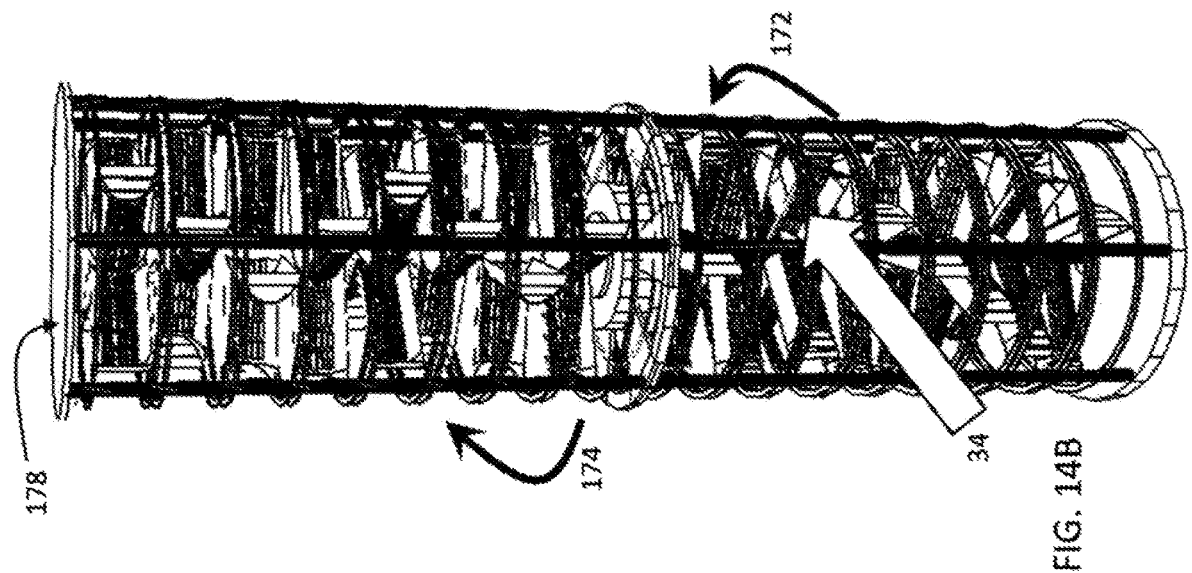
FIG. 14B is a perspective view of the alternative embodiment of the vertical axis windmill system of FIG. 14A.
Figure 14A:
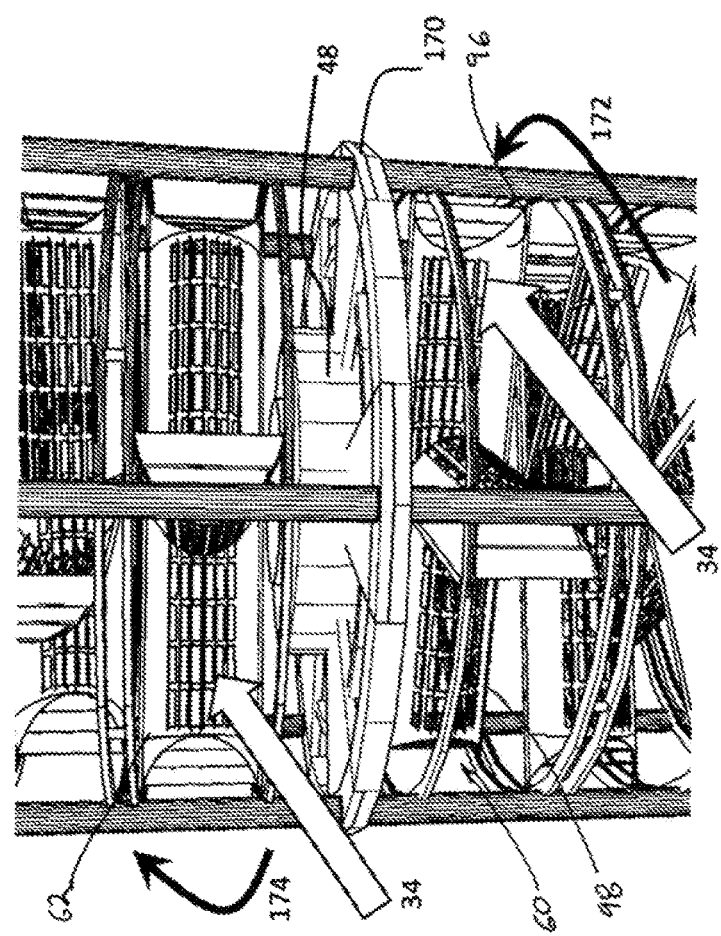
FIG. 14A is a perspective view of a portion of an alternative embodiment of the vertical axis windmill system.

Referring to FIG. 14A, a perspective view of a portion of an alternative embodiment of the vertical axis windmill system 40 is shown. In this embodiment, the system 40 has a central structure 170 having a pair of generators 48. The vertical windmill units 58 below the central structure 170 each has a rotation unit 60 where the blades 62 are orientated such that wind represented by arrow 34 causes the rotation unit 60 to rotate counter-clockwise as represented by arrow 172. The same wind represented by arrow 34 causes the blades 62 above the central structure 170 to rotate clockwise as represented by arrow 174 in that the rotation units 60 are orientated in the opposite direction; the blades 62 are configured such the concave side 96 and the convex side 98 are on the opposite side.

Referring to FIG. 14B, a perspective view of the alternative embodiment of the vertical axis windmill system 40 of FIG. 14A is shown. The set of vertical windmill units 58 located above and below of the central structure 170 spin in opposite directions to each other; the rotors of the generators 48 located at the central structure 170 spin in output directions. The lower level windmill turns counter clockwise 172 from wind flow as represented by arrows 34 on the concave side 96. The same wind as represented by the arrows 34 on the upper level windmill results in the rotation units 60 because of their orientation turning clockwise 174 This feature is important for balancing structural pressure rather than having all the pressure applied to turning in a single direction. The vertical axis windmill system 40 has a roof 178 on the upper structure 46 that can provide space for solar panels further increasing electrical output.

Figure 15:
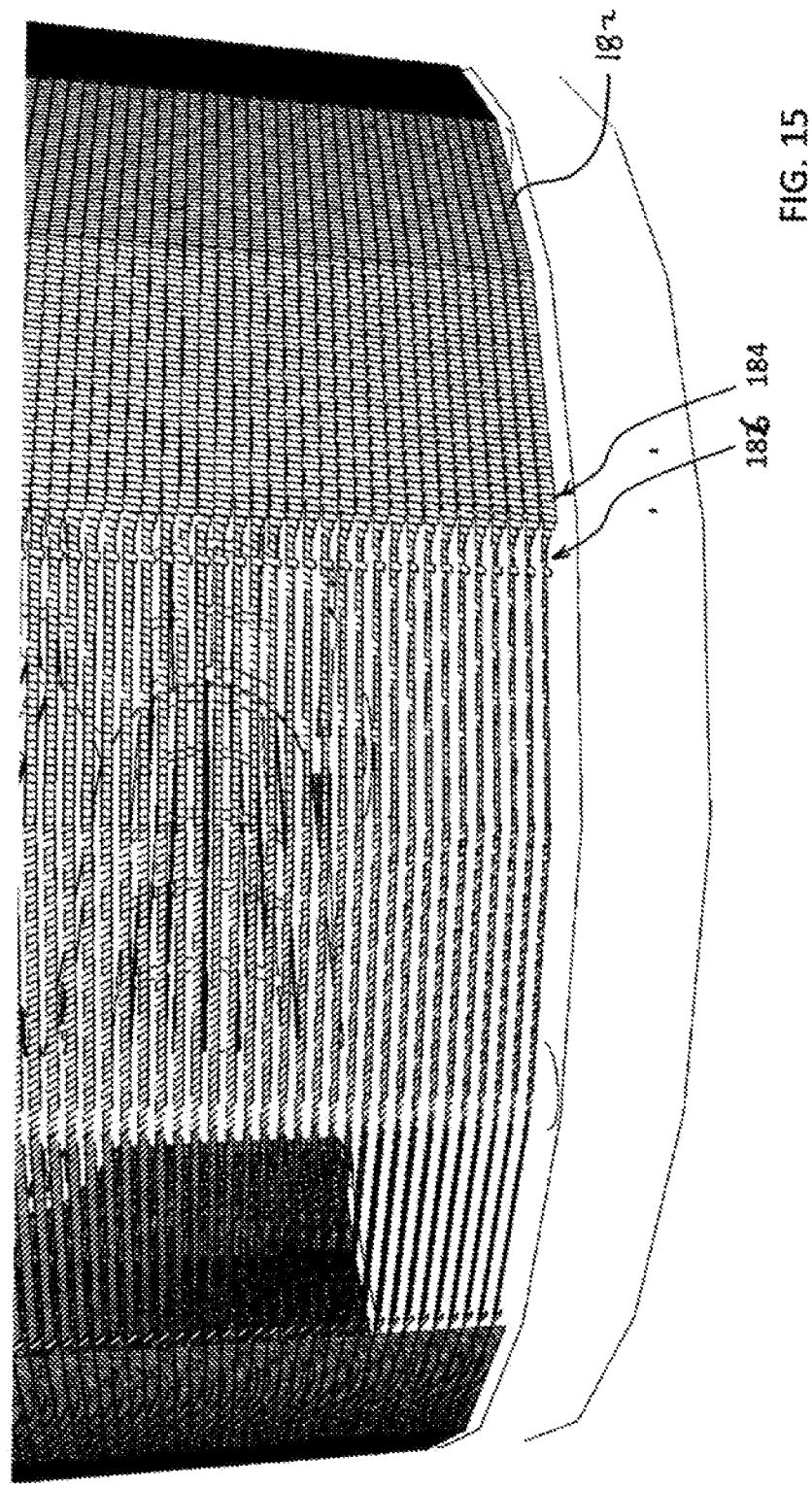
FIG. 15 is a perspective view of an alternative embodiment with a plurality of vertical blinds serving as a means to reduce visual blight.

Referring to FIG. 15, a perspective view of an alternative embodiment of the vertical axis windmill system 40 with a plurality of vertical blinds 182 serving as a means to reduce visual blight is shown. In the area where the wind blows, the blinds 182 move from a vertical position as indicated by arrow 184 towards a horizontal position as indicated by arrow 186.

On the side where the wind is coming from as represented by arrow 34, the blinds 182 flip inward. On the opposite side of the vertical axis windmill system 40, the wind is coming out of the system and the blinds 182 flip outward. The blinds 182 that are parallel to the direction of the wind 34 stay generally in the vertical position 184 as seen on either side of the FIG.

Figure 16:
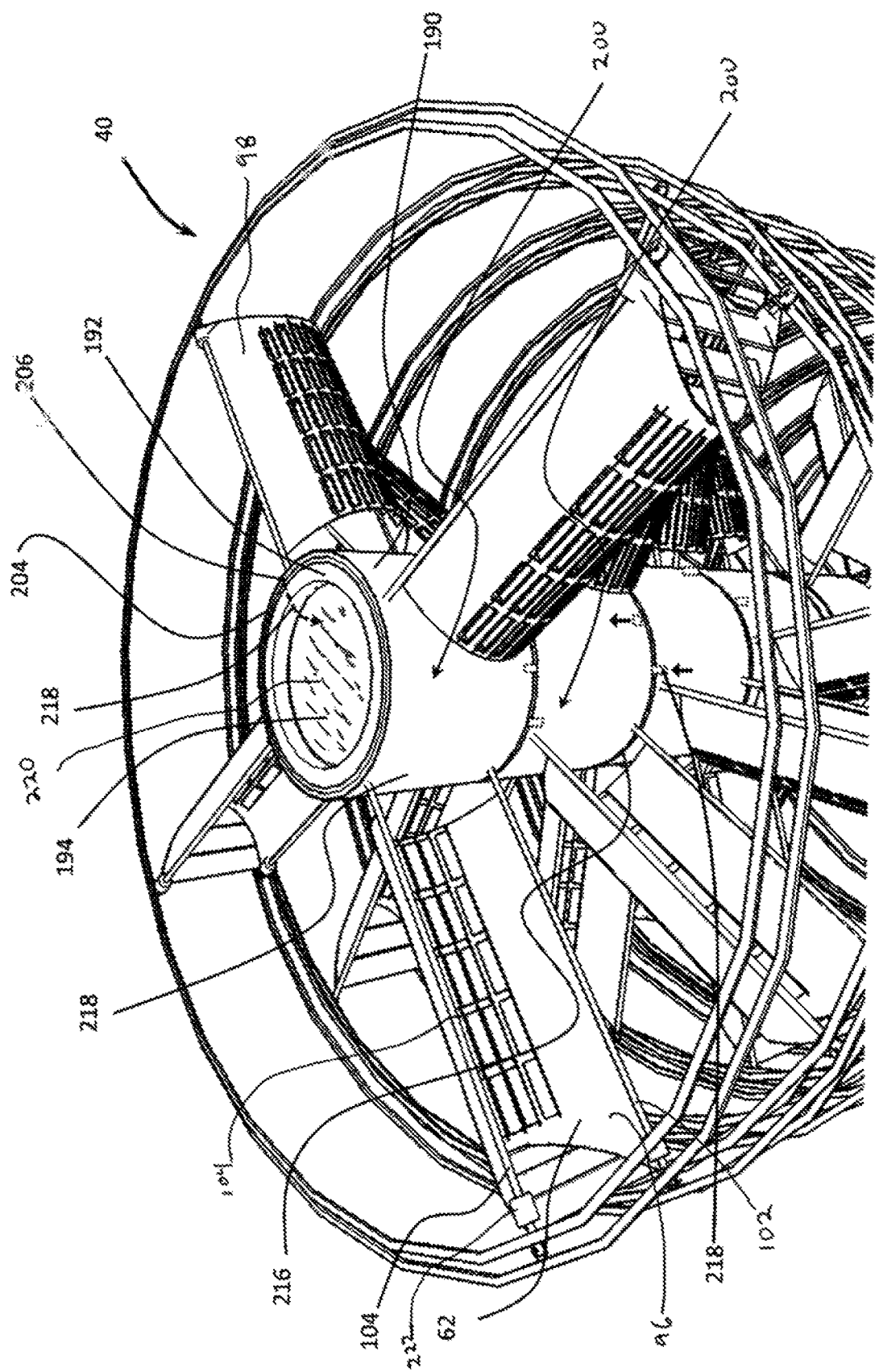
FIG. 16 is a perspective view of an alternative embodiment of a vertical axis windmill system with a water-powered system including a cylindrical reservoir.

Referring to FIG. 16, a perspective view of an alternative embodiment of a vertical axis windmill system 40 with a water-powered system 190 including a cylindrical reservoir 192 is shown. The vertical support columns 50 are not shown. The cylindrical reservoir 192 has an inner cylindrical area 194 for storing water 220 (or a working fluid). The water-powered system 190 has a series of cylindrical walls 196 including an outer cylindrical rotating wall 198 to which the lower horizontal support rods 102 and the upper horizontal support rods 104 of the blades 62 are secured. The outer cylindrical rotating wall 198 is formed of a plurality of segments 200 which are capable of rotating's separately.

The plurality of cylindrical walls 196 includes a second cylindrical wall 204 which defines an annular area 206 between itself and the outer cylindrical rotating wall 198 through which water (or working fluid) 220 is pushed upward as explained below.

Figure 18A:
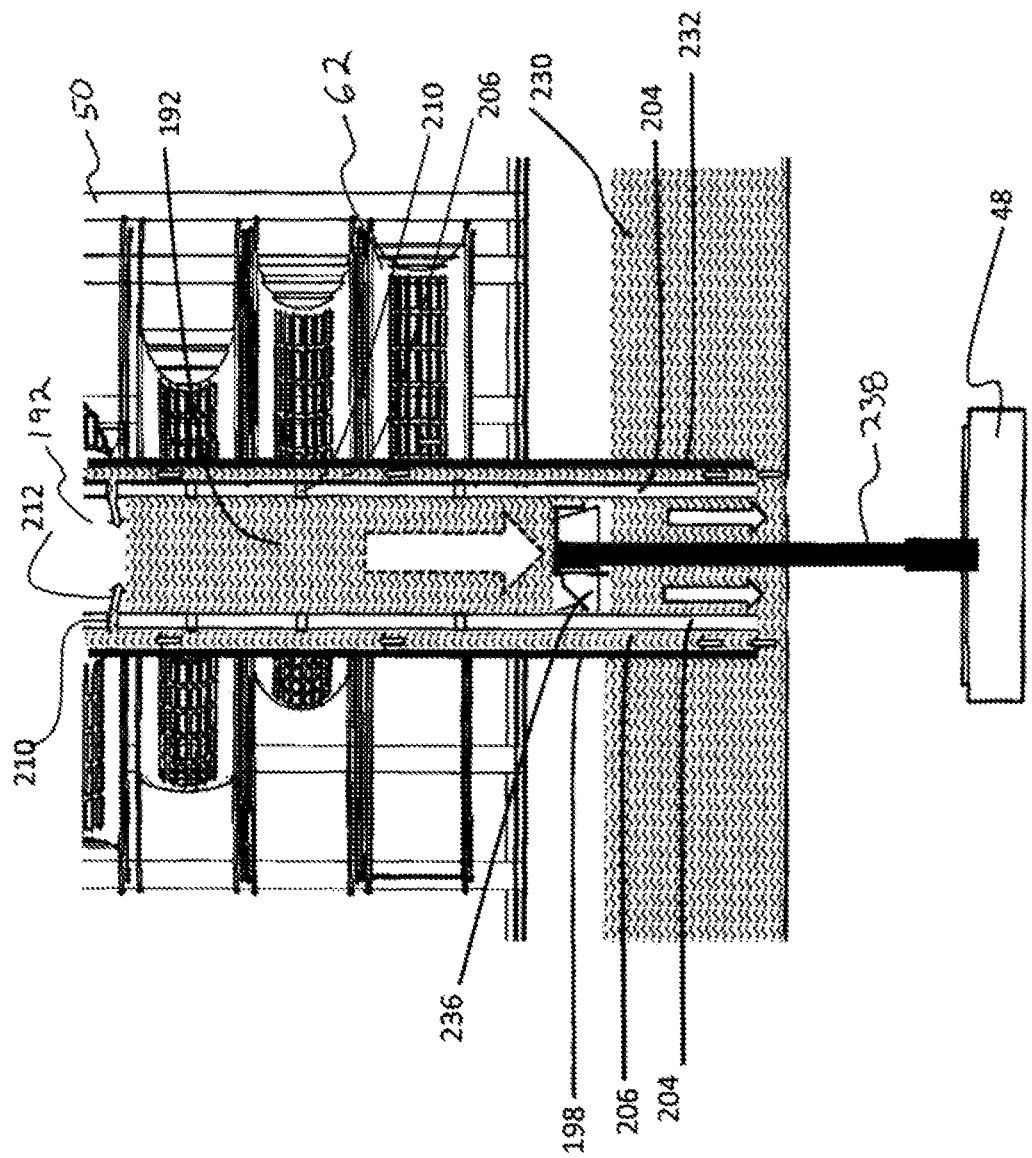
FIG. 18A is a sectional view of the base of the vertical axis windmill system 40 of FIG. 16.

In the embodiment shown, the second cylindrical wall 204 is a concrete cylindrical wall and has a plurality of valves 210 associated with openings in the second cylindrical wall 204. The water or working fluid 220 that reaches the top of the annular area 206 flows as represented by arrow 212 to the cylindrical reservoir 192 that extends downward from the top of the system 40 to the base 44 as seen in FIG. 18A.

Each of the rotation units 60 with the blades 62 pushes the water 220 upward using mechanical devices such as blades or paddles in the annular area 206 to a transitional area 216 from one rotation unit 60 to the next rotation unit 60. The next rotation unit 60 pushes the water 220 upward into the next transitional area 216; the transitional area 216 is described in further detail with respect to a particular embodiment with respect to FIGS. The purpose of the transitional area 216 is to limit the weight of the water 220 to one of the rotation units 60 which includes the plurality of blades 62 so as not to weigh down the lower units. The transitional areas 216 allow the water to flow upwards from one level to the other via a plurality of vertical check valves represented by dotted line 218, which allows the water to come up from the segment 200 below, but not down. The valve 218 at the top of the segment 200 allows the water into the next level.

Still referring to FIG. 16, the stabilizing structure 108 of the rotation unit 40 has added weights 222 at the end of each blade 62 in order to create a more balanced centrifugal force.

Referring to FIG. 17, a perspective view of the vertical axis windmill system 40 of FIG. 16 is shown. The water-powered system 190 of the vertical axis windmill system 40 has a water tank 226 at the top of the system 40 serving as storage for power accumulation during hours of low demand for electricity. The water 220 is pumped from an underground container 228. The system 190 has a lowest outer cylindrical rotating wall 232 of the outer cylindrical 198 which extends below the lowest sets of blades 62. The system 190 has the generator 48 at the bottom of the base 24.

Referring to FIG. 18A, a sectional view of the base of the vertical axis windmill system 40 of FIG. 16 is shown. The underground container 228 of the water-powered system 190 has an underground water storage area 230 from where a first rotating unit, the lowest outer cylindrical rotating wall 232 begins to push the water upwards in the annular area 206 between the outer cylindrical rotating unit 198 and the second cylindrical wall 204.

The water 220 in the cylindrical reservoir 192 creates a pressure and causes a propeller 236 which rotates a shaft 238 that turns the rotor of the generator 48. The second cylindrical wall 204 is shown having a plurality of valves 210 through the wall 204 to allow water 220 to flow from the annular area 206 to the cylindrical reservoir 192 as explained below.

Figure 18B:
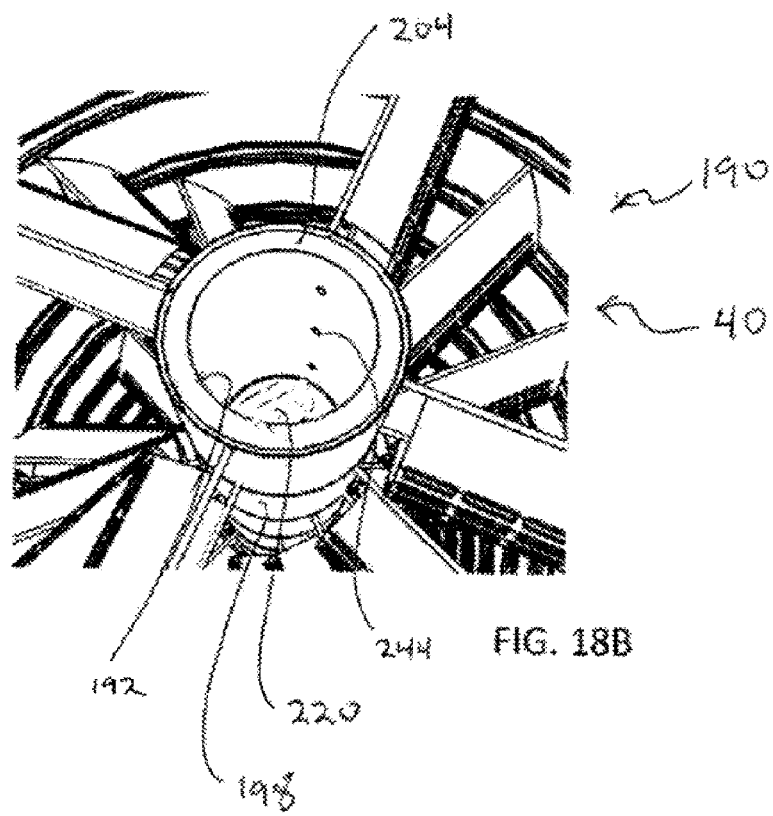
FIG. 18B is a perspective view of the upper portion of the water-powered system of the vertical axis windmill system of FIG. 17.

Referring to FIG. 18B, a perspective view of the upper portion of the water-powered system 190 of the vertical axis windmill system 40 is shown. The level of water 220 in the cylindrical reservoir 192 may vary dependent on the consumption of power. If the water level in the cylindrical reservoir 192 is below a certain level, the system has a plurality of openings 244 connected to one of the valves 210 through the second cylindrical wall 204 that allows water 220 to enter the cylindrical reservoir 192. There is no back pressure on the water 220 to come into the cylindrical reservoir 192 as represented by arrow 212 in that the water level is below as shown in FIG. 18A. This feature allows the water 220 to be fed into the cylindrical reservoir, the tank, 192 without needing to be pushed to the top of the reservoir 192 but rather anywhere along the height of the reservoir 192 where the water inside is lower than a given opening 244 and the associated valve 246.

Figure 19:
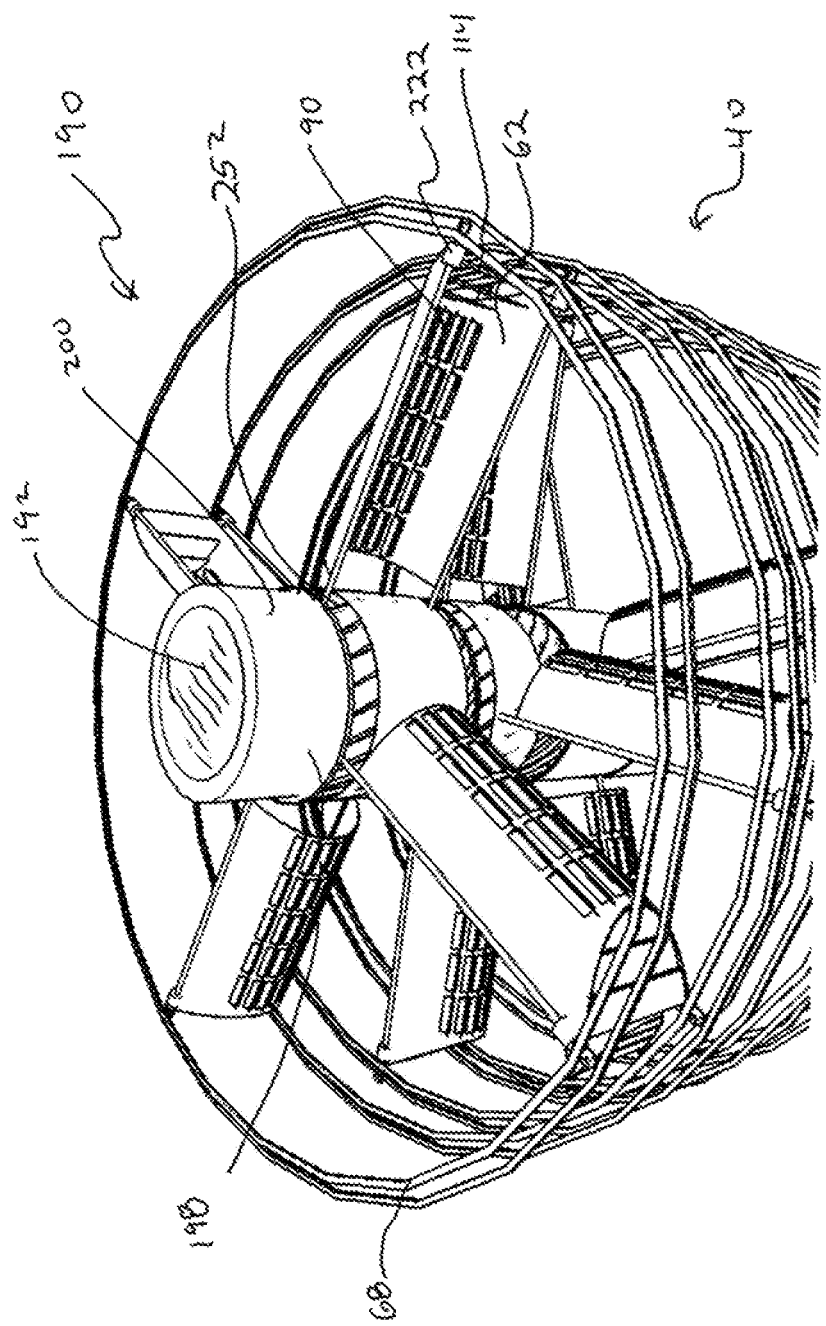
FIG. 19 is a perspective view of an alternative embodiment of a vertical axis windmill system with a water-powered system including a cylindrical reservoir.

Referring to FIG. 19, a perspective view of an alternative embodiment of a vertical axis windmill system with a water-powered system 190 including a cylindrical reservoir 192 is shown. A portion of the outer cylindrical rotating wall 198 is broken away at the transitional area 216. A plurality of vanes 252 are shown.

Figure 20A:
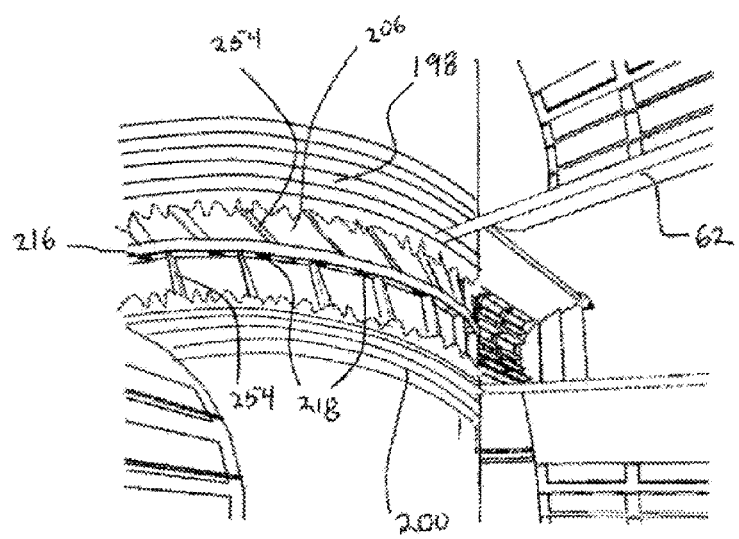
FIG. 20A is an enlarged perspective view of the transitional area between the two segments.

Referring to FIG. 20A, an enlarged perspective view of the transitional area 216 between two segments 200 is shown. The blades 62 are secured to the outer cylindrical rotating wall 98, which acts as the rotatable central shaft 56 of the embodiment in FIG. 1. The blades 62 are secured by the lower horizontal support rod 102 and the upper horizontal support rod 104.

The outer cylindrical rotating wall 198 has a plurality of vanes 254 that extend into the annular area 206. The rotation of the blades 62 and the associated outer cylindrical rotating wall 198 of the segment 200 causes the vanes 254 to push the water 220 in the annular area 206 upward. When the water 220 reaches the transitional area 216, the water is forced through the vertical check valve 218.

Figure 20B:
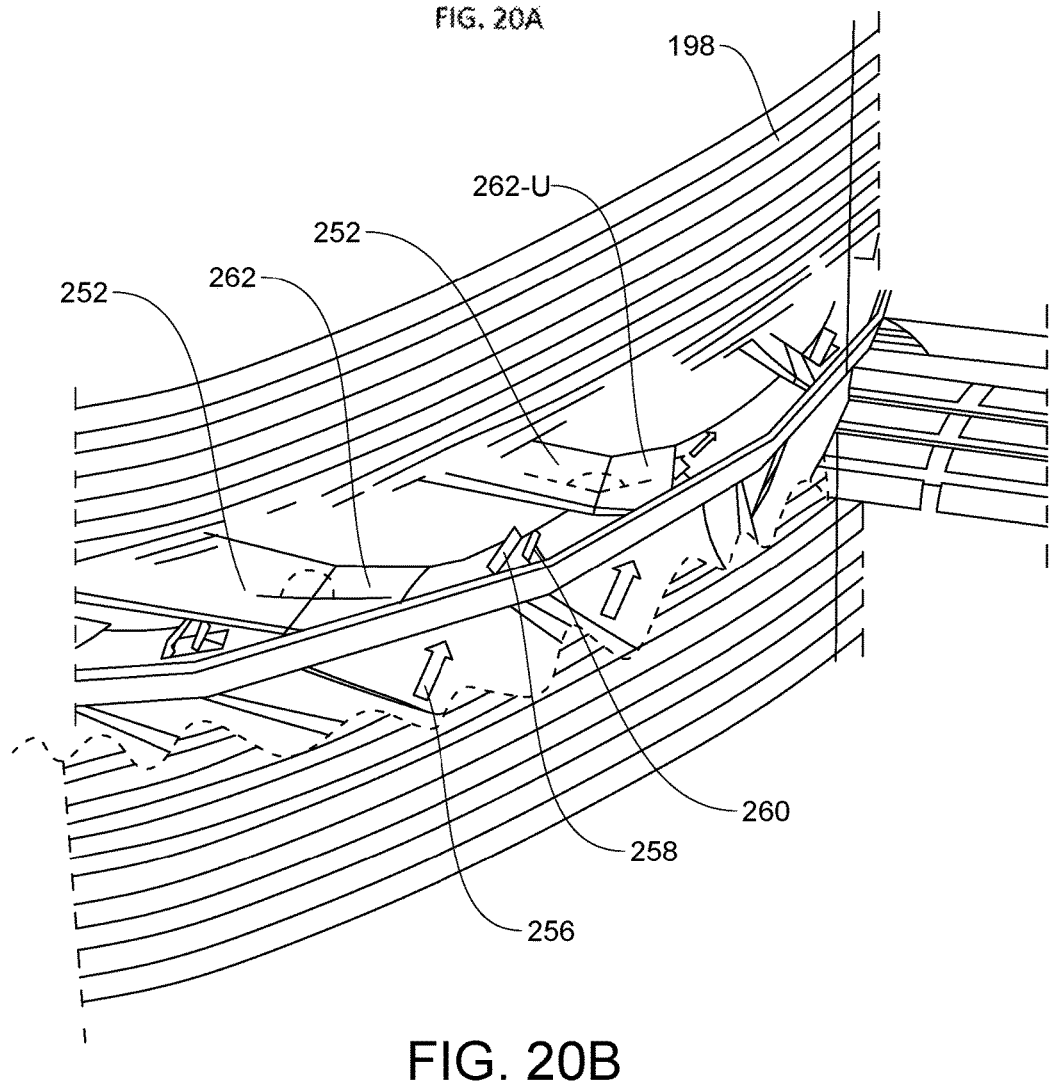
FIG. 20B is an enlarged view of the transitional area with portion of the outer cylindrical rotating wall broken away.

Referring to FIG. 20B, an enlarged view of the transitional area 216 with a portion of the outer cylindrical rotating wall 98 broken away is shown. The vanes 252 on the lower rotation unit push the water 220 in an upper ward counter-clockwise direction as represented by arrow 256. When the water 220 reaches the vertical check valve 218, the force of the water 220 causes the valve to open as represented by a flap 258. The arrow 260 represents the water 220 passing through the check valve 218.

The vanes 252 on the upper rotation unit 60 are shown. The vanes 252 have a flexible scoop 262 that flexes up as represented by 262-U as the scoop 262 passes over the flap 258 of the vertical check valve 218.

The transitional area 216 has the non-rotational portion that includes the vertical check valve 218 including the flap 258.

Figure 21:
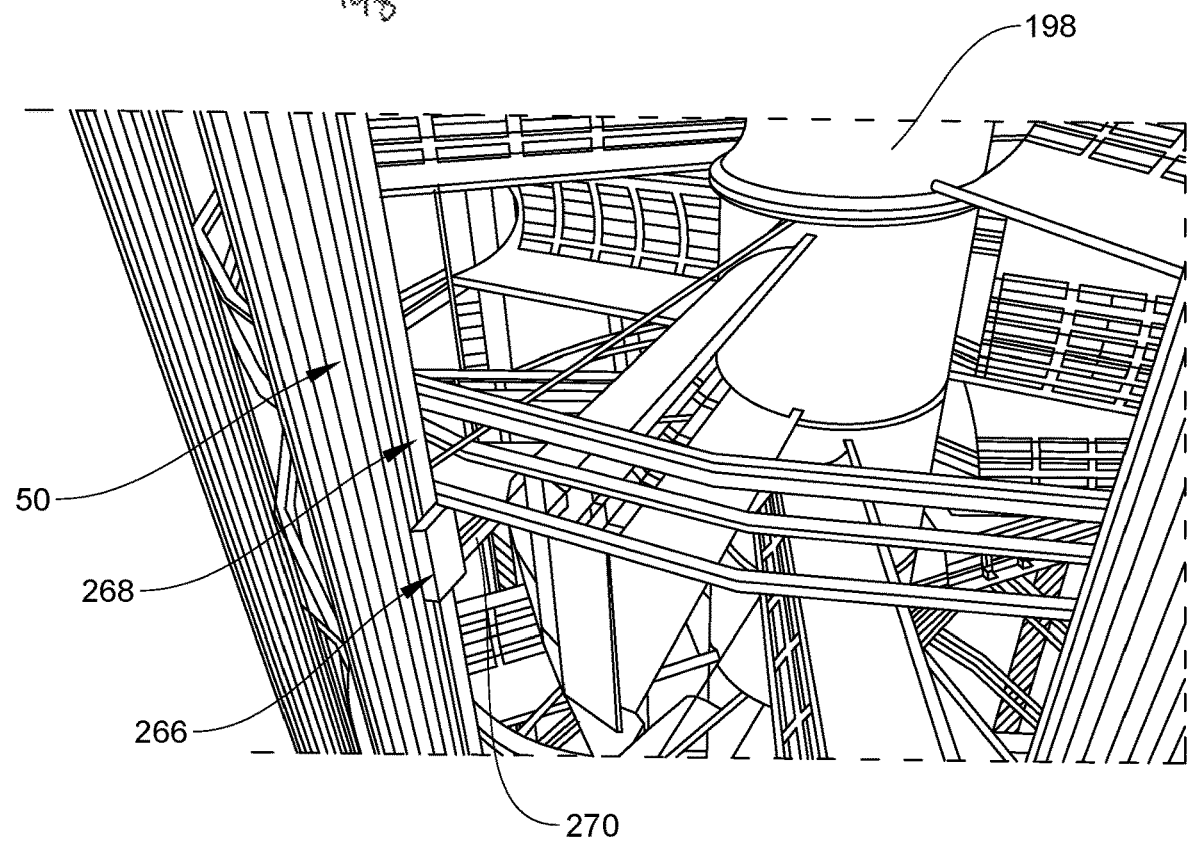
FIG. 21 is a perspective view of a portion of an alternative embodiment of a water-powered system of the vertical axis windmill system.

Referring to FIG. 21, a perspective view of a portion of an alternative embodiment of a water-powered system 190 of the vertical axis windmill system 40 is shown. The water-powered system 190 has a pump 266 carried on the vertical support columns 50 for pushing water up at least one vertical pipe 268 along the vertical support columns 50. The system 190 has a plurality of horizontal pipes 270 along the height of the vertical axis windmill system 40 that take the water from the vertical pipe 268 to the cylindrical reservoir 192 if the water 220 in the reservoir 192 is below the height of the particular horizontal pipe 270.

Referring to FIG. 22A, a perspective top view of the water-powered system 190 of the vertical axis windmill system 40 of FIG. 16 is shown. Four vertical windmill units 58 are shown which are identified as 58a, 58b, 58c, and 58d in FIG. 19A and FIG. 19B. While the transitional area 216 is shown between adjacent outer cylindrical rotating wall 198 of the rotation unit 60, the segments 200 of the outer cylindrical rotating unit 198 are one unit and rotate together. The four sets of the rotation units 60 are stacked vertically each turned at 22.5 degrees from the previous one shown by dotted line 272 and forming a 90-degree angle shown by dotted line 274. Thus, four of these rotation units 60 with four blades 62 each results in a total of 16 blades 62.

In this embodiment, the transitional area 216 is secured to the second cylindrical wall 204, which does not rotate. The segments 200 are connected to each other by a structure that encircles the transitional area 216 and rotates with the segments.

It is recognized that the 22.5 degree offset is used in some of the previously-disclosed embodiment. It also recognized that the offset could be another angle for example three rotation units 60 with 30 degree offset or five rotation units 60 with 18-degree offset. In addition, while four blades 62 are shown in a rotation unit 60, it is recognized that the number of blades per rotation unit 60 could also vary.

Figure 23B:
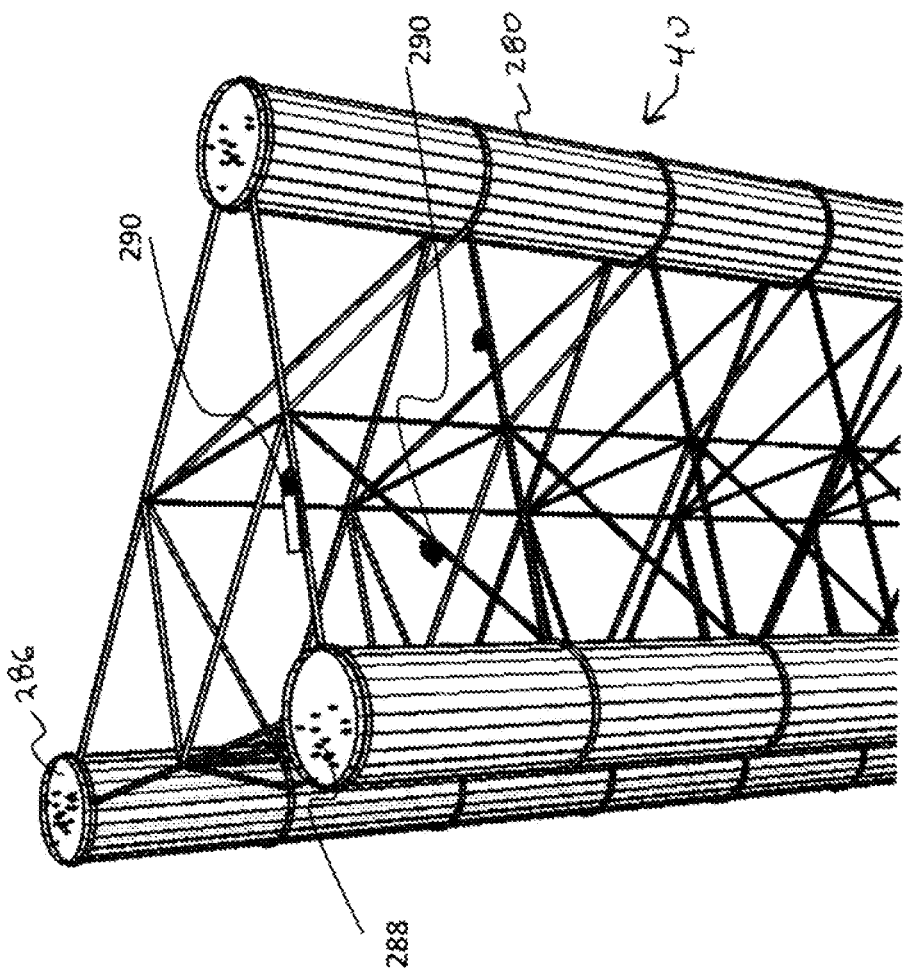
FIG. 23B is a perspective view of the upper portion of the system with the plurality of towers of FIG. 23A.
Figure 23A:
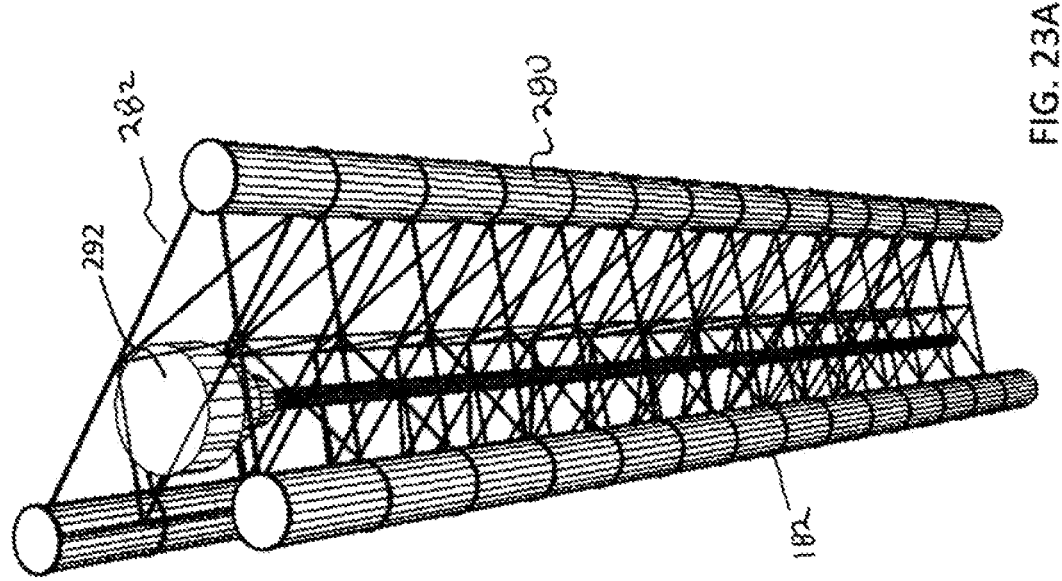
FIG. 23A is a perspective view of an alternative embodiment of a vertical axis windmill system with a plurality of towers.

Referring to FIG. 23A, a perspective view of an alternative embodiment of a vertical axis windmill system 40 with a plurality of towers 280 is shown. Each tower 280 is a vertical axis windmill system 40 in itself. The system 40 could be an of the embodiments discussed above such as the embodiment shown in FIG. 1 or the embodiments with the water-powered system such as the embodiment shown in FIG. 17. The towers 280 can have vertical blinds 182 such as in FIG. 15. The embodiment shows three towers 280 in triangular formation connected with a plurality of structural elements 282 that makes it possible to build the system 40 higher.

In that there is a fixed cost associated with building a system 40 in addition to the variable cost dependent on the size, the increased size results in being able to produce power at a lower overall cost per kilowatt.

Referring to FIG. 23B, a perspective view of the upper portion of the system 40 with the plurality of towers 280 is shown. The system 40 has the added feature of a viewing area 286 on the upper structure 46 of each of the towers 280. An elevator system carries people 288 from the base 44 to the upper structure 46. The system has a mini train 290 that can bring people 288 between the towers 280 and the viewing areas 286. It is recognized that the mini train 290 can also mover along the structural elements 282 from the base 44 to the upper structure 46 and the viewing area 286.

Referring back to FIG. 23A, the system 40 can also have a water reservoir 292 to store energy in addition to the water-powered system 190 that may be associated with a tower 280.

Figure 24B:
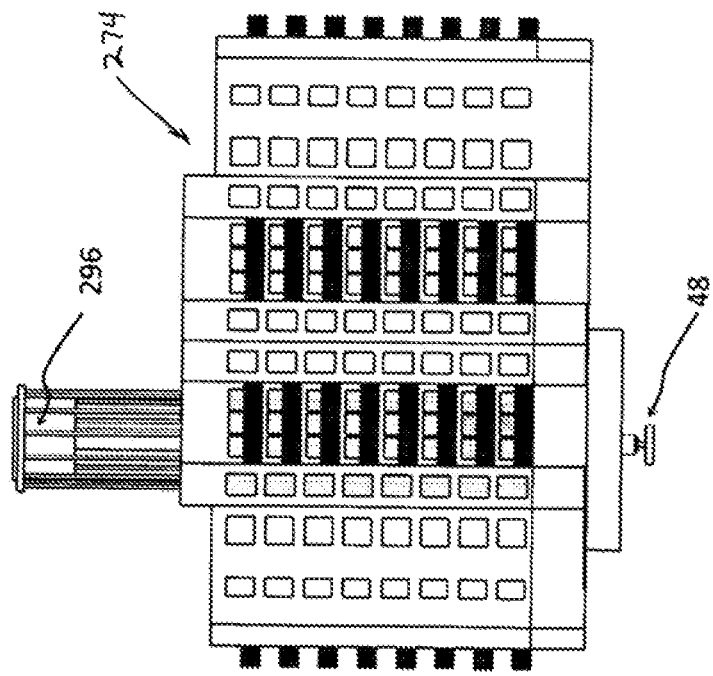
FIG. 24B is a perspective view of the high-rise building with a water reservoir.
Figure 24A:
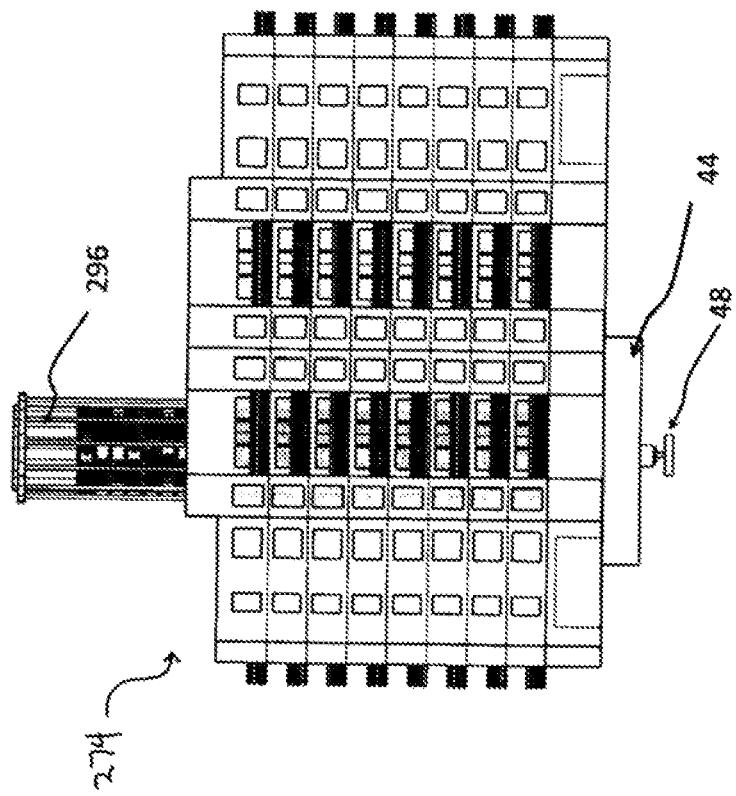
FIG. 24A is a perspective view of a high-rise building with an alternative vertical windmill system including a water-powered system.

Referring to FIG. 24A, a perspective view of a high rise building 294 with an alternative vertical axis windmill system 40 including a water-powered system 190 is shown. The water-powered system 190 includes an additional water reservoir 296 to store energy generated by the blades 62 when the energy is not required for use when the wind does not generate sufficient energy for the demand. The model brings economies of scale when implemented together with new construction providing both a source of energy, as well as a means of storage for power.

Referring to FIG. 24B, a perspective view of the high rise building 274 with a water reservoir 296 shows the embodiment without the windmill where water can be stored in an upper reservoir 70 and provide power as needed via a generator 48.

Referring to FIG. 25, a perspective view of an apartment building 294 with a pair of vertical axis windmill system 40 installed on the roof 298 of an apartment building 40 without the water storage feature of the water reservoir 296. It is contemplated that the system 40 can include the water-power system 190 or be a system without the water-power system 190.

Figure 26:
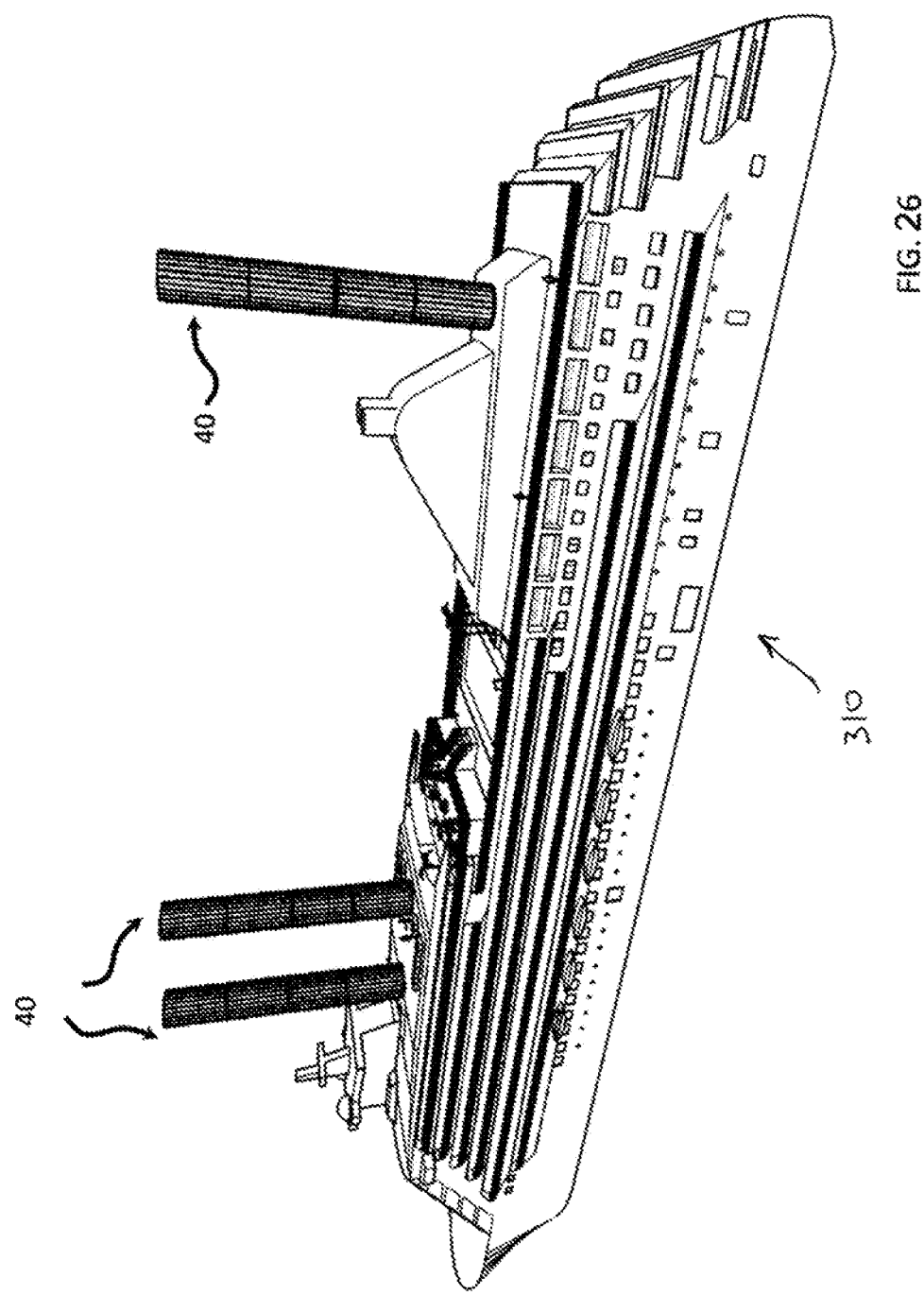

Referring to FIG. 26, a perspective view of a ship 310 with a pair of vertical axis windmill system 40 is shown.

Figure 27:
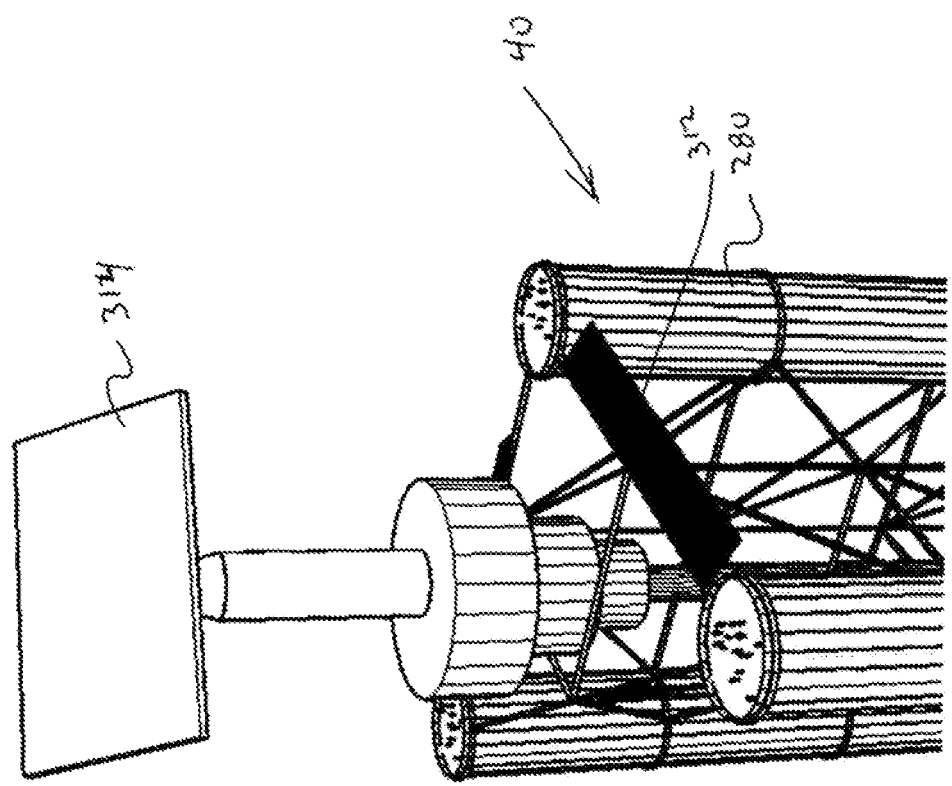
FIG. 27 is a perspective view of an alternative embodiment of a vertical axis windmill system with a plurality of towers including a pair of solar arrays.

Referring to FIG. 27, a perspective view of an alternative embodiment of a vertical axis windmill system 40 with a plurality of towers 280 including a pair of solar arrays 312 and 314.

It is contemplated that the vertical axis windmill system 40 can be built in various size. For example, it is contemplated that system can be of the size where the overall diameter is 1 to 2 feet. The height of all of the system 40 including the base 44 and the upper structure 46 including generator 48 and the intervening vertical windmill unit 58 is between 3 to 4 feet. It is contemplated that there is a minimum of four (4) rotation units 60. A system at this size can be taken for camping to charge batteries as well as placed in balconies or porches.

In addition, the system 40 can be sized for installation on a residential roof or backyard. It is contemplated that the diameter would be in the 3 to 4-foot range and a height of 6 to 7 feet. This size range allows for easy transportation and placement.

Larger sizes can be in the 10-foot diameter range with a height in the 30-foot range for use on places such as a high-rise building such as shown in FIG. 25. Further sizes can be in the 30 to 40 feet diameter range and a height in approximately 300-foot range which is suitable for open areas including at highway interchanges with unused land. The system 40 can be as tall as the tall building to date, particularly when designed in a group of at least three connected towers which allow for effective structural design. This provides further economies of scale including the placement of a single water-power unit capturing the water-powered upwards by all three towers. This model provides for recreation areas for visitors at the top of the structure.

EQUIVALENTS

The invention may be embodied in other specific forms without departing from the spirit or essential characteristics thereof. The foregoing embodiments are therefore to be considered in all respects illustrative rather than limiting on the invention described herein. The true scope of the invention is thus indicated by the descriptions contained herein, as well as all changes that come within the meaning and ranges of equivalency thereof.

It is recognized that a rotation unit can have a single blade. A plurality of rotation unit forms a plurality of blades that are spaced around.

It is recognized that the system 40 can have a solar panel on top and/or sides. The solar panel can either be fixed or expandable. During sunny days, the solar energy can be used to pump water to a cylindrical reservoir 192 or water reservoir 292 or 294 for later energy use or fed directly into the grid.

It is recognized that the vertical blinds 182, such as seen in FIG. 15, can also contain solar panels.

It is recognized that the solar panels can be deployed along the height of the tower as well as at the top of the tower.

In addition, it is recognized that the sun can heat the vertical pipes 268 to assist in moving the water upward toward the top and the reservoir.
trical energy.

What is claimed:
1. A vertical axis windmill comprising:
a rotation unit, the rotation unit including:
a rotatable central shaft;
a plurality of blades, each of the plurality of blades having a plate extending from the rotatable central shaft to an outer end, the plate of each blade of the plurality of blades having an upper edge and a lower edge; the plate having a curvature from the upper edge to the lower edge,
a plurality of openings in the plate of each blade of the plurality of blades, and
a plurality of flaps, each flap of the plurality of flaps pivotably mounted to the plate of each blade of the plurality of blades,
an end plate secured to the outer end of the plate of each blade of the plurality of blades for redirecting the air associated with the wind, wherein the end plate includes a plurality of vertical flaps, each vertical flap of the plurality of vertical flaps pivotably mounted to the end plate of each blade of the plurality of blades, and
at least one solar panel.
2. The vertical axis windmill of claim 1, wherein the at least one solar panel is fixed.
3. The vertical axis windmill of claim 1, wherein the at least one solar panel is expandable.
4. The vertical axis windmill of claim 1, wherein the at least one solar panel is disposed at a top of the windmill.
5. The vertical axis windmill of claim 1, wherein the at least one solar panel is disposed along at least one side of the windmill.
6. The vertical axis windmill of claim 1, further comprising at least one blind disposed at an outer periphery of the windmill, the at least one blind extending vertically over at least a portion of a height of the windmill.
7. The vertical axis windmill of claim 6, wherein the at least one blind includes the at least one solar panel.
8. The vertical axis windmill of claim 1, further comprising a generator for converting the rotation motion of the rotatable central shaft to electrical energy.
9. The vertical axis windmill of claim 1, further comprising a generator for converting solar energy to electrical energy.
10. A vertical axis windmill system comprising:
a plurality of vertical axis windmill towers, each of the plurality of vertical axis windmill towers connected to an adjacent tower;
each vertical axis windmill tower including:
a rotation unit, the rotation unit including:
a rotatable central shaft;
a plurality of blades, each of the plurality of blades having a plate extending from the rotatable central shaft to an outer end, the plate of each blade of the plurality of blades having an upper edge and a lower edge; the plate having a curvature from the upper edge to the lower edge;
a plurality of openings in the plate of each blade of the plurality of blades; and
a plurality of flaps, each flap of the plurality of flaps pivotably mounted to the plate of each blade of the plurality of blades;
an end plate secured to the outer end of the plate of each blade of the plurality of blades for redirecting the air associated with the wind, wherein the end plate includes a plurality of vertical flaps;
at least one solar panel.
11. The vertical axis windmill system of claim 10, wherein the plurality of vertical axis windmill towers includes three vertical axis windmill towers, the three vertical axis windmill towers arranged in a triangular configuration.

12. The vertical axis windmill system of claim 10, wherein a plurality of structural supporting elements extend between the plurality of vertical axis windmill towers.

13. The vertical axis windmill system of claim 10, wherein the at least one solar panel is fixed to at least one of the plurality of vertical axis windmill towers.

14. The vertical axis windmill system of claim 10, wherein the at least one solar panel is expandable.

15. The vertical axis windmill system of claim 10, wherein the at least one solar panel is disposed at a top of at least one of the plurality of vertical axis windmill towers.

16. The vertical axis windmill system of claim 10, wherein the at least one solar panel is disposed along at least one side of at least one of the plurality of vertical axis windmill towers.

17. The vertical axis windmill system of claim 10, further comprising at least one blind disposed at an outer periphery of at least one of the plurality of vertical windmill towers, the at least one blind extending vertically over at least a portion of a height of the at least one vertical windmill tower.

18. The vertical axis windmill system of claim 17, wherein the at least one blind includes the at least one solar panel.

19. The vertical axis windmill system of claim 10, further comprising a generator for converting the rotation motion of the rotatable central shaft to electrical energy.

20. The vertical axis windmill system of claim 10, further comprising a generator for converting solar energy to electrical energy.

* * * * *